United States Patent Office 3,838,108
Patented Sept. 24, 1974

3,838,108
ISOCYANATE EXTENDED POLYMERS AND THE FORMATION OF BLOCK COPOLYMERS
William L. Hergenrother and Richard J. Ambrose, Akron, Ohio, assignors to The Firestone Tire & Rubber Company, Akron, Ohio
No Drawing. Filed Jan. 19, 1972, Ser. No. 219,161
Int. Cl. C08g 22/00, 41/04
U.S. Cl. 260—77.5 CR     86 Claims

ABSTRACT OF THE DISCLOSURE

Polymers of anionically polymerized monomers are made with an organo alkali metal initiator and then reacted with either polyisocyanates or polyisothiocyanates which remove the alkali atoms and form a novel polymeric composition containing isocyanate or isothiocyanate terminated polymers. These polymers may then be reacted with compounds containing an isocyanate or an isothiocyanate reactive group. The isocyanate or isothiocyanate terminated polymers under anhydrous polymerization conditions may also be blocked with nylon forming monomers to form various nylon block copolymers. The isocyanate or isothiocyanate terminated polymers of the polymeric composition when reacted with urea forming monomers produce urea block copolymers. Reaction of the isocyanate or isothiocyanate terminated polymers with urethane forming monomers will produce urethane block copolymers. The isocyanate and isothiocyanate terminated polymers of the polymeric composition when reacted with imide forming monomers produce imide block copolymers.

BACKGROUND OF THE INVENTION

The present invention relates to the formation of polymeric compositions containing polymers terminated by either an isocyanate or an isothiocyanate. The invention also relates to the reaction of these polymers with a compound containing an active hydrogen. In another aspect, the present invention relates to the formation of nylon block copolymers by reacting the isocyanate or the isothiocyanate terminated polymers with nylon forming monomers. In yet another aspect, the present invention relates to the formation of urea block copolymers by reacting the isocyanate or the isothiocyanate terminated polymers with urea forming monomers. In yet another aspect, the present invention relates to the formation of urethane block copolymers by reacting the isocyanate terminated polymers with urethane forming monomers. In yet another aspect, the present invention relates to the formation of imide block copolymers by reacting the isocyanate or the isothiocyanate terminated polymers with imide forming monomers.

The polymerization of conjugated dienes and/or vinyl substituted aromatic compounds with organo alkali metal initiators is well known in the art. The resulting alkali metal terminated polymers often are reacted with polyfunctional compounds to couple the polymers. For example, as disclosed in U.S. Pats. Nos. 3,135,716 and 3,468,972 coupling agents which may be polyisocyanates or polyisothiocyanates are employed to replace terminal alkali metal atoms and to couple the polymers. In another U.S. patent, No. 3,225,119, isocyanates are reacted with the alkali metal terminated polymers to form an A-B-A type block polymer wherein A represents a polymer made from isocyanate monomers. In yet another U.S. patent, No. 3,281,383, compounds having at least three functional groups such as the polyisocyanates are coupled through the reaction with alkali metal terminated polymers to yield "radial" or multiple long branched polymers. None of these patents, however, disclose the preparation of anionically polymerized polymers which are terminated by isocyanates or isothiocyanate groups. Furthermore, anionic polymers used in the preparation of block copolymers having a constituent other than the polymer or which constituent is made solely from isocyanate monomers are not disclosed.

Prior U.S. patents, Nos. 3,291,859 and 3,396,210, disclose a polymeric moiety which is formed by reacting a polymer which contains at least one active hydrogen with a polyisocyanate containing material. However, these patents do not disclose a base polymer which lacks an active hydrogen and yet is bonded to a polyisocyanate. The 3,291,859 patent also discloses that the polymer moiety can be used for making a block copolymer but only when a dual functional free-radical initiator is used.

Another aspect of the prior art relates to the desirability of using nylon as a molding resin for specific end use requirements. The nylon used often had a relatively low molecular weight in order that the nylon would possess the low melt viscosities necessary to fill molds rapidly. However, the use of low molecular weight nylon is undesirable since often toughness, which increases with molecular weight, is sacrificed.

Yet another aspect of the prior art relates to the use of urea polymers for specific end use requirements. However, these polymers generally are not processable at temperatures below the melt temperature of the polymer.

Yet another aspect of the prior art relates to the use of urethane polymers for specific end use requirements. However, these polymers generally are not processable at temperatures below the melt temperature of the polymer. Another aspect of the prior art relates to a thermoplastic urethane elastomer which is a block copolymer but is only processable at temperatures above its melting point.

Yet another aspect of the prior art relates to the use of imide polymers for specific end use requirements. However, these polymers generally cannot be molded, milled or processed at temperatures below the melt temperature of the polymer.

SUMMARY OF THE INVENTION

It is, therefore, an object of the present invention to produce anionic polymerized polymers which are reacted with either polyfunctional isocyanates or polyfunctional isothiocyanates to provide a polymeric composition containing isocyanates or isothiocyanate terminated polymers.

It is also an object of the present invention to produce isocyanate terminated or isothiocyanate terminated polymers which are reacted with active hydrogen compounds.

It is another object of the present invention to provide a new nylon block copolymer by reacting an isocyanate or isothiocyanate terminated polymer with nylon forming monomers.

It is yet another object of the present invention to provide a nylon block copolymer which has rubbery properties or is suitable as a thermoset and yet otherwise generally retains the properties characteristic of nylon.

It is a further object of the present invention to provide a nylon block copolymer which is readily molded below the melt temperature of the nylon constituent.

It is another object of the present invention to provide a new urea block copolymer by reacting an isocyanate or an isothiocyanate terminated polymer with urea forming monomers.

It is yet another object of the present invention to provide a new urea block copolymer which has processable properties at temperatures below the melt temperature of the urea constitutent.

It is another object of the present invention to provide a new urethane block copolymer by reacting an isocyanate terminated polymer with urethane forming monomers.

It is yet another object of the present invention to provide a new urethane block copolymer which has processable properties at temperatures below the melt temperature of the urethane constituent.

It is another object of the present invention to provide a new imide block copolymer by reacting an isocyanate or an isothiocyanate terminated polymer with imide forming monomers.

It is yet another object of the present invention to provide a new imide block copolymer which is millable, moldable and processable at temperatures below the melting point of the imide constituent.

It is yet another object of the present invention to provide a method for the production of anionically polymerized polymers which are terminated by either an isocyanate or an isothiocyanate.

It is yet another object of the present invention to provide a method for the production of isocyanate or isothiocyanate terminated polymers which are connected to active hydrogen compounds.

It is yet another object of the present invention to provide a method for the production of a new nylon block copolymer.

It is yet another object of the present invention to provide a method for the production of a new urea block copolymer.

It is yet another object of the present invention to provide a method for the production of a new urethane block copolymer.

It is yet another object of the present invention to provide a method for the production of a new imide block copolymer.

These and other objects of the present invention will be apparent in view of the following detailed description and are accomplished by means hereinafter described and claimed.

In general, a polymeric composition containing isocyanate or isothiocyanate terminated polymers can be produced by anionically polymerizing certain monomers with an organo alkalki metal initiator and then reacting the resulting polymers with polyfunctional isocyanates or isothiocyanates. The isocyanate or isothiocyanate terminated polymers may be reacted with compounds containing an active hydrogen. Reaction of either the isocyanates or the isothiocyanate terminated polymers with nylon forming monomers under anhydrous conditions will produce a nylon block copolymer. Reaction of either the isocyanate or the isothiocyanate terminated polymers with urea forming monomers will produce urea block copolymers. The isocyanate terminated polymers when reacted with urethane forming monomers will produce urethane block copolymers. Reaction of either the isocyanate or the isothiocyanate terminated polymers with imide forming monomers will produce imide block copolymers.

PREFERRED EMBODIMENTS OF THE INVENTION

The monomers which can be anionically polymerized by the initiators described herein to form a base polymer and then reacted with the polyisocyanates or polyisothiocyanates also described herein to prepare isocyanate or isothiocyanate terminated polymers include a wide variety of materials. Generally, any monomer capable of undergoing anionic polymerization can be used. Some of these monomers can be generally classified as olefins since they contain at least one olefinic group and may be represented by the following structural formulae, wherein R is hydrogen, alkyl or cycloalkyl and wherein Ar is an aromatic ring or a substituted aromatic ring:

(1) $CH_2=CACN$ wherein A is CN, $CF_3$, $CH_3$, or H
(2) $CH_2=CACO_2R$ wherein A is $CO_2R$, $SO_2R$, $CH_3$ or H
(3) $CH_2=CANO_2$ wherein A is Cl, $CH_3$ or H
(4) $CH_2=CACON(R)_2$ wherein A is $CH_3$ or H.

Other monomers which can be anionically polymerized are represented by the following structural formulae:

(5) 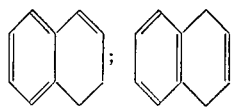

(6) 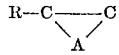

where A is O or S and R is H or an aliphatic, cycloaliphatic or aromatic group containing from 1 to 15 carbon atoms, inclusive.

(7) RCH=A where A is O or S and R is an aliphatic, cycloaliphatic or aromatic group containing from 1 to 15 carbon atoms, inclusive.

(8) 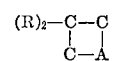

where A is O or S and R is an aliphatic, cycloaliphatic or aromatic group containing from 1 to 15 carbon atoms, inclusive.

(9) $(R)_2C=S$ where R is an aliphatic, cycloaliphatic or aromatic group containing from 1 to 15 carbon atoms, inclusive.

The monomers as represented by formulae 6, 7, 8 and 9 are preferred in the subject invention. Examples of such monomers include ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isobutyrthioaldehyde, n-caprothioaldehyde, 3-dimethyloxycyclobutane, 3-diethyloxycyclobutane, 3-methylethyloxycyclobutane, 3-dimethylthiocycylobutane, 3-diethylthiocyclobutane, 3-methylethylthiocyclobutane, methyl ethyl thioketone, methyl isopropyl thioketone and diethyl thioketone. Suitable monomers represented by formula No. 9 do not include large R's such as two phenyl groups since such monomers are difficult to polymerize due most probably to steric hindrance.

Other prefered monomers which may generally be used to prepare the isocyanate terminated polymers of this invention are the conjugated dienes and the vinyl substituted aromatic compounds. The conjugated dienes ordinarily contain from 4 to 12 carbon atoms and preferably from 4 to 8 carbon atoms. Examples of such dienes include 1,3-butadiene; isoprene; 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene and the like. The vinyl substituted aromatic compounds include styrene, 1-vinylnaphthalene, 2-vinylnaphthalene, and the alkyl, cycloalkyl, aryl, alkaryl and arakyl derivatives thereof in which the total number of carbon atoms in the combined substituents is generally not greater than 12. Examples of such compounds include 3-methylstyrene; α-methylstyrene; 4-n-propylstyrene, 4-t-butylstyrene, 4-dodecylstyrene, 4-cyclohexylstyrene; 2-ethyl-4-benzylstyrene; 4-methoxystyrene; 4-dimethylaminostyrene; 3,5-diphenoxystyrene; 4-p-tolylstyrene, 4-phenylstyrene; 4,5-dimethyl-1-vinylnaphthalene; 3-n-propyl-2-vinylnaphthalene and the like.

The conjugated dienes and the vinyl substituted aromatic compounds as well as many of the other monomers noted herein generally can be polymerized alone or in admixture to form homopolymers, copolymers or block copolymers which serve as the base polymer. The dienes which are preferred are 1,3-butadiene and isoprene, and preferred vinyl substituted aromatic monomers are styrene, α-methylstyrene and 4-t-butylstyrene. A preferred base copolymer is styrene-butadiene.

Yet another group of monomers which can be employed are the heterocyclic nitrogen containing monomers such as pyridine and quinoline derivatives containing at least 1 vinyl or alphamethylvinyl group such as 2- vinylpyridine, 3-vinylpyridine, 4-vinylpyridine, 3-ethyl-5-vinylpyridine, 3-methyl-5-vinylpyridine, 3,5-diethyl-4-vinylpyridine and similar mono- and di-substituted alkenyl pyridines and like quinolines such as 2-vinylquinoline, 3-vinylquinoline, 4-vinylquinoline and so forth. In general, the various vinyl substituted pyridines and vinyl substituted quinolines are also preferred monomers.

The polymers are prepared by anionically polymerizing the monomers with organo alkali metal initiators in a manner which is well known to those skilled in the art. Although these initiators can be either mono- or polyfunctional, the mono-functional initiators are preferred for the present invention. The preferred metal is lithium although sodium, potassium, rubidium and cesium are generally suitable. Hence, the preferred class of compounds can be represented by the formula RLi wherein R is a hydrocarbon radical selected from the group consisting of aliphatic, cycloaliphatic and aromatic radicals containing from 1 to 30 carbon atoms per molecule. Examples of these initators include methyllithium, n-butyllithium, n-amyllithium, n-decyllithium, phenyllithium, naphthyllithium, p-tolyllithium, cyclohexyllithium, eicosyllithium, and the like. The essential feature of these initiators is that they possess a carbonlithium bond which acts on the point of initiation for the polymerization. The growth of the polymer is also propagated through the carbonlithium bond which becomes a part of the polymer at this stage. Of the resulting polymers obtained, substantially all have a lithium atom positioned at one end.

The amount of catalyst employed depends primarily on the monomers to be used and the characteristics desired in the polymer produced. In general, an increased amount of catalyst leads to the production of a lower molecular weight polymer whereas a reduced amount of catalyst has an opposite effect. Suitable polymers having a molecular weight in the range of 10,000 to about 100,000 can be readily prepared, ordinarily by using initiator levels in the range of about 1 to 10 millimoles per 100 grams of monomer (mhm.). Of course, polymers of higher or lower molecular weights can be prepared by varying the initiator level. Thus, polymers of high molecular weights which may be viscous or solid can be produced by using an initiator level of approximately 0.25 mhm. or less. Generally, the initiator level for this invention is commonly in the range of about 1 to 40 mhm., although both higher and lower initiator levels can be used.

Formation of the polymers is generally carried out at a temperature in the range between $-100$ and $+150°$ C. and preferably between $-78$ and $+50°$ C. with temperatures at the lower part of the range being desirable at this stage. The precise temperature of polymerization, of course, will depend to a large degree upon the particular reactivities of the monomers being reacted.

The process or the polymerizations are generally carried out in a hydrocarbon or ether medium. Normally, the solvents or diluents are paraffins, cycloparaffins or aromatics containing from 4 to 10 carbon atoms per molecule. Examples of solvents include n-butane, n-hexane, n-heptane, isooctane, cyclohexane, methylcyclohexene, benzene, toluene, xylene, tetrahydrofuran and the like. The important considerations in selecting a solvent are that they should be inert, they should have some affinity for the polymer formed and they should not contain in their structure any active hydrogen atoms, or any impurities having an active hydrogen atom such as water, alcohols, acids or groups which would have a tendency to act as a chain terminating or transfer agent.

In accordance with the concepts of the present invention, the lithium terminated polymers are reacted with a polyisocyanate or a polyisothiocyanate monomer to produce end capped polymers having at least one unreacted isocyanate or isothiocyanate end portion. The terms polyisocyanate and polyisothiocyanate are used in this specification in the sense that the compounds described by these terms are polyfunctional and therefore may react with two or more entities. The polyisocyanates and the polyisothiocyanates are preferably those compounds represented by the formula $R(N=C=X)_n$ where R can be aliphatic containing from 2 to about 20 carbon atoms, a cycloaliphatic containing from 4 to about 20 carbon atoms and an aromatic containing from 6 to about 20 carbon atoms, $n$ is an integer of either 2 or 3, preferably 2, and X is a chalcogen (oxygen or sulfur). Examples of polyisocyanates include diphenyl diisocyanates, dichloroxanylene diisocyanates, 2,4,4'-triisocyanate-diphenyl ether, triphenyl methane triisocyanate, benzene-1,2,4-triisocyanate, naphthalene-1,3,7-triisocyanate and the like. Preferred polyisocyanates include meta or paraphenylene diisocyanate diphenyl methane diisocyanates, bitolylene diisocyanates, dianisidine diisocyanates, isophorone diisocyanates, toluene diisocyanates, hexamethylene diisocyanate and pentamethylene diisocyanate. Examples of polyisothiocyanates generally include compounds which are the same as the polyisocyanates but wherein, of course, a sulfur atom has been substituted for the oxygen atom. Thus, suitable polyisothiocyanates include diphenyl diisothiocyanates, dichloroxanylene diisothiocyanates, 2,4,4'-triisothiocyanate-diphenyl ether, triphenyl methane triisothiocyanate, benzene-1,2,4-triisothiocyanate, naphthalene-1,3,7-triisothiocyanate and the like. Preferred polyisocyanates include meta or paraphenylene diisothiocyanate, diphenyl methane diisothiocyanates, bitolylene diisothiocyanates, dianisidine diisothiocyanates, isophorone diisothiocyanates, toluene diisothiocyanates, hexamethylene diisothiocyanate and pentamethylene diisothiocyanate.

Henceforth in the specification whenever reference is made to isocyanate or polyisocyanate compounds, it should be obvious to one skilled in the art that such reference also includes isothiocyanate or polyisothiocyanate compounds.

The amounts of polyfunctional isocyanates which may be used generally depend upon the particular system to be produced. For most systems, the equivalent ratio of the polyisocyanates to the alkali metal or lithium present in the polymers may range from 1.1 to about 20 while in other systems the upper limit of the range may be in excess of 100. When an excess amount is used, free nylon will be formed and hence, the nylon will exist in the polymeric composition. When a polyisocyanate is employed to react with the lithium terminated or base polymers, each polyfunctional isocyanate will sometimes react with a different lithium terminated polymer, thereby coupling the polymers and forming a resulting polymer which does not contain an isocyanate group on an end portion of the polymer. This situation generally cannot be avoided and therefore to achieve at least some polymers which have at least one isocyanate end group, the equivalent ratio of the polyfunctional isocyanates to the lithium must be greater than 1.0. Should the equivalent ratio be less than one but greater than 0.5 of the resultant polymeric solution may contain, and when the equivalent ratio is 0.5 or less the resultant polymeric solution will likely contain, some unreacted lithium terminated polymers. When the equivalent ratio is approximately 2.0, statistical considerations reveal that when a diisocyanate is employed, approximately 50% of the polymers have an isocyanate end group. When a triisocyanate is employed with an equivalent ratio of three, the amount of polymers which are terminated by at least one unreacted isocyanate group is increased to approximately 67%. In general, as the equivalent ratio increases, the percentage of isocyanate terminated polymers increases as well as the amount of completely unreacted or free polyisocyanates. Generally, an amount of polyisocyanate should be used so that at least 5% and preferably at least 20% of the polymers are terminated by at least one isocyanate group. As should be apparent to one skilled in the art, the addition of polyfunctional isocyanates should be carried out rapidly to avoid excessive coupling.

During the process of formation of the isocyanate terminated polymers it is important that the reaction be carried out in an environment substantially free from active hydrogen compounds such as water, alcohol or acids so that the polymers are terminated by an isocyanate group. Hence, the process is usually carried out in an inert atmosphere such as in a nitrogen atmosphere.

The temperature range for the polyfunctional isocyanate reaction is generally between $-100$ and $+150°$ C., and preferably between $-78$ and $+70°$ C. It has been found that temperatures at the lower end of the preferred range produced better results, possibly since polyfunctional isocyanate consuming side reactions are reduced.

The novel polymeric compositions containing isocyanate terminated polymers vary widely in their properties and in general, exhibit properties of the base polymer. Some of the compositions are plastic whereas others are elastic. These compositions thus can be used in a wide range of applications where they can be extruded, calendered and otherwise treated as plastics or elastics. Yet other compositions made from butadiene are rubbery and thus can be used for wire cable insulation, tire tread and inner tubes. Furthermore, these compounds can be combined with curing agents, fillers and the like and generally can be molded.

The invention will be more fully understood by referring to the following examples.

Example 1

To a clean, dry, nitrogen purged 28 oz. beverage bottle was added 600 cc. of purified tetrahydrofuran, 77.6 g. of butadiene and 1.52 cc. of 1.64 molar ($2.49 \times 10^{-3}$ moles) butyl lithium in hexane solution. The bottle was cooled to $-20°$ C. and held at this temperature for four hours until the butadiene had polymerized. To this lithium polybutadiene which was 85% 1,2-microstructure was added rapidly 5.92 cc. of a 1.22 molar ($7.21 \times 10^{-3}$ moles) toluene diisocyanate solution in toluene. The resulting polymer had an average molecular weight of 31,000.

The above polymer was cured at 160° C. for about 34 minutes with 6 parts of dicumyl peroxide per 100 parts of polymer. The following physical properties were obtained:

Hardness Rockwell E _____ 33
Flex strength _____ p.s.i__ 4,020
Flex modulus _____ p.s.i__ 202,600
Izod notch _____ ft. lbs./inch notch__ 0.15

Example 2

To a clean, dry 28 oz. beverage bottle was added 500–600 cc. of purified toluene, 98.1 g. of butadiene and 1.43 cc. of 1.75 molar ($2.5 \times 10^{-3}$ moles) butyl lithium in hexane solution. The bottle was stirred magnetically overnight at 25° C. before rapidly adding 2.52 cc. of 0.995 molar toluene diisocyanate ($2.5 \times 10^{-3}$ moles). This solution was stirred for one hour and the product was precipitated with methanol. The resulting polymer had a viscosity average molecular weight of 56,000 g./mole.

The above polymer was compounded in chloroform solution with one part of dicumyl peroxide per 100 parts of polymer. The following physical properties were obtained:

| Cure time (minutes) | Hardness, Shore A | Ultimate elongation, percent | Modulus (p.s.i.) 5% | Break |
|---|---|---|---|---|
| 4 | 53.5 | 40 | 22 | 75 |
| 20 | 63.5 | 30 | 34 | 125 |

The above described isocyanate or isothiocyanate terminated polymers of the polymeric composition may be further reacted with isocyanate or isothiocyanate reactive compounds such as compounds containing an active hydrogen. The vast majority of active hydrogen compounds which may have a molecular weight range from a very small number to that of a large polymer generally form a stable isocyanate or isothiocyanate adduct. Although the temperature range of this process may generally range from $-100$ to $100°$ C., usually, the reaction of the isocyanate or isothiocyanate terminated base polymer with a compound containing an active hydrogen will readily proceed at ordinary temperatures or after moderate heating without the use of catalysts. Catalysts, of course, may be used in the process if the reaction proceeds rather slowly. Since, generally, isocyanates as well as isothiocyanates react readily with water, it is important that the process be carried out in an environment substantially free from water such as in an inert atmosphere unless it is desired that water is to be used to produce urea. Additionally, the process is usually carried out at atmospheric pressure although suitable pressures or even a vacuum may be utilized. Obviously, the process is to be free from undesirable active hydrogen compounds so that the desired product is produced.

In general, the reaction and reactivity of isocyanates are better understood when the electronic structure of the isocyanate group and the effect on this structure of various groups attached to the nitrogen atom are considered. A qualitative consideration of the resonance hybrids from the standpoint of the molecular orbital theory indicates that the electron or charge density is greatest on the oxygen (highest net negative charge) and least on the carbon (highest net positive charge) with the nitrogen atom being intermediate in having a net negative charge. Thus, the reactions of isocyanates with active hydrogen compounds usually involve attack by a nucleophilic center upon the electrophilic carbon of the isocyanate. Disregarding steric factors, any electron-withdrawing group attached to the NCO moiety will increase the positive charge on the carbon atom and thereby increase the reactivity of the isocyanate towards nucleophilic attack. Conversely, any electron-donating group will reduce the reactivity of the NCO moiety. Similarly, the reactivity of the agent attacking the electrophilic carbon of the NCO moiety will increase as its nucleophilicity increases. Thus, generally, consideration of these factors in most cases makes it possible to predict on a qualitative basis the relative reactivity of various isocyanated base polymers with compounds containing active hydrogen. Of course, steric factors must also be considered.

The electronic structure of isothiocyanates is generally similar to the above isocyanates except that the charge density of the sulfur atom will not be as great as the charge density on the oxygen atom. Hence, isothiocyanate compounds will generally tend to be less reactive than isocyanate compounds.

As noted above, reference to isocyanate compounds hereinafter is understood to also include isothiocyanate compounds.

The many compounds which contain an active hydrogen are obvious to one skilled in the art and since the number of such compounds is large, only some of the major groups of active hydrogen compounds will be recited.

An example of a group of compounds which contain an active hydrogen are the halogen acids. When reacted with isocyanates they form carbamyl halides which are stable at room temperatures but tend to dissociate into an isocyanate and a hydrogen halide at temperatures in the range of 90–100° C.

Another group of compounds which contain an active hydrogen are practically all of the compounds which contain a hydrogen atom bonded to a nitrogen atom. A specific example is hydrogen cyanide which when reacted with two equivalents of an isocyanate and water forms a five member ring compound which is very thermally stable in that it maintains its properties at elevated temperatures. Other examples are amines which generally react to give substituted ureas, amides which generally give acyl ureas and ureas which give biurets. Similarly, the hydrazines, amidines, nitramines and diazoamino compounds generally react as expected.

Yet another group of compounds which generally contain an active hydrogen are the compounds which contain a hydrogen atom bonded to an oxygen atom. Thus, all types of alcohols such as primary, secondary, tertiary and polyhydric react to give carbamate esters. Phenols including polyhydric phenols also react, especially in the presence of aluminum chloride. Weak aromatic and aliphatic carboxylic acids react to give mixed anhydrides whereas stronger acids such as trichloracetic and formic acid form mixed anhydrides which readily decompose into amides and carbon dioxide. In general, water reacts rapidly with isocyanates at ordinary temperatures to give disubstituted ureas and carbon dioxide and in the presence of sodium hydroxide to give as a principal product a primary amine.

Another group of active hydrogen compounds are those containing carbon-hydrogen bonds. Thus, the carbanions of sodiomalonic esters and related compounds produce N-substsituted amides. Additionally, N-substituted aroyl-amides are produced by the Friedel-Crafts synthesis.

The group of compounds containing a sulfur atom bonded to a hydrogen atom generally contains an active hydrogen and such compounds usually react with isocyanates in the same way as its oxygen analog except that it is usually less reactive. Thus, hydrogen sulfide reacts with isocyanates to give disubstituted ureas and carbon oxysulfide. Additionally, compounds containing mercaptan groups may also be used.

Polymers containing an active hydrogen may also be reacted with the isocyanate terminated base polymers to form copolymers. Examples of such polymers include polyethers, polyesters, polyamines, polyimides, polyureas and the like. Of course, the polymer which is reacted with the base polymer may be formed in situ.

Reactive isocyanate compounds which do not contain an active hydrogen include lithium aluminum hydride which generally reduces aryl and alkyl isocyanates to the corresponding methylamines and most Grignard reagents which react rapidly with isocyanates forming substituted amides.

The foregoing compounds constitute only a portion of the reactive isocyanate compounds which predominately comprise active hydrogen compounds. As is obvious to one skilled in the art, the present invention is not limited solely to these noted compounds. Other examples of compounds containing reactive isocyanate compounds, including active hydrogen compounds, can be found in reference materials such as *The Chemistry of the Organic Isocyanates* by J. H. Saunders and R. J. Slocombe, *Chemical Review*, American Chemical Society, 1948; and *Recent Advances in Isocyanate Chemistry* by R. G. Arnold, J. A. Nelson and J. J. Verbanc, *Chemical Review*, American Chemical Society, 1956.

In general, the product formed between the reaction of the isocyanate terminated polymers and active hydrogen compounds as well as isocyanate reactive compounds exhibit the properties of the base polymers when the molecular weight of the active hydrogen compound is very small. Hence, such products may generally be used for the same purpose as the base polymer. Depending upon the base polymer, the products can be processed and used in applications according to their rubbery, plastic or elastic nature. Hence, many of the products may be cured and molded, and used for tire cord, tire tread and wire insulation.

In order that the invention is better understood, the reaction of isocyanate terminated base polymers with active hydrogen compounds as exemplified by various polymeric forming monomers which may be reacted with other monomers to produce novel block copolymer products will be discussed and explained in detail.

NYLON

The isocyanate terminated polymers of the polymeric composition can generally be reacted under certain conditions with nylon forming monomers to produce novel block copolymers having many properties characteristic of the nylons. However, unlike the nylons, the block copolymers have the properties of being moldable at temperatures below the melt temperature of the corresponding nylon and millable at ambient temperatures even when the block copolymer contains a high nylon content.

The lactams or the internal amides represent monomers which will undergo anionic polymerization and since they contain an active hydrogen, they will react with the isocyanate terminated polymers to form nylon block copolymers. These block copolymers when a diisocyanate is used to terminate the base polymer are generally of the BN type where N represents a nylon polymer and where B represents an isocyanate terminated polymer which preferably is formed from conjugated dienes, vinyl substituted aromatics and vinyl pyridines. If a triisocyanate is used, the BN type block copolymer will generally contain a base polymer or a nylon polymer grafted onto the back of the block copolymer. The lactams should contain at least 3 carbon atoms in the lactam ring and may be represented by the formula:

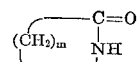

wherein *n* is a integer of at least 2 and up to 15 and preferably from 5 to 12. Examples of specific lactams include caprolactam and caprylactam.

It has been found that the formation of the nylon block copolymer must be carried out in an environment substantially free from active hydrogens such as water, alcohols, or acids except, of course, for the active hydrogen nylon forming monomers since the existance of active hydrogen compounds which react with the isocyanate terminated polymers is detrimental to the formation of the nylon block copolymer. Furthermore, since isocyanates react readily with water, care must be taken to insure that the process is carried out under anhydrous conditions. In the present process involving the formation of the nylon block copolymer, substantially free generally means that the content of water, and hence the active hydrogen content in the reaction, is generally below one hundred parts per million, and, preferably, the amount of water is generally below five parts per million. In order to achieve such low active hydrogen levels, it may be necessary to purge the reaction vessel with a relatively inert gas such as nitrogen so that an inert atmosphere exists. The temperature at which the polymerization is carried out is generally in a range between 0° and 260° C. and preferably between 120° and 180° C. In general, to produce a copolymer having favorable properties, it is desirable to polymerize at a temperature which is below the melting point of the corresponding nylon.

The resulting nylon block copolymers retain generally the favorable characteristics of the nylon. For example, the block copolymers generally exhibit the properties of good impact, good abrasion resistance, low coefficients of friction and toughness over a wide weight percent of the nylon to the total weight of the copolymer. Additionally, the processing properties of the base polymer are generally imparted to the nylon block copolymer. For example, the nylon block copolymers are readily millable and processable at ambient temperatures. Should free nylon exist in the polymeric composition as when an excess of polyfunctional isocyanate is used, the favorable processing properties will generally diminish as the amount of free nylon increases. As another example, if the base polymers are 1,2 polybutadiene or 1,4 polybutadiene, the resultant copolymers can respectively be molded either as plastics or as rubbers, at temperatures below the melt temperature of the nylon.

The size or weight of the base polymer constituent and the nylon polymer constituent of the copolymer are generally not critical and can vary over a wide range depending upon the ultimate physical properties desired. Generally, the nylon polymer constituent can range from about 5% to about 99% of the total weight of the block polymer. The molecular weight of the nylon constituent, although usually not as important as the nylon content, may ordinarily vary from 20,000 to 30,000 and generally higher or lower if desired. The block copolymers generally are useful as rubbers at low and intermediate nylon content if the base polymer is 1,4 polybutadiene (hoses and the like), as plastics at low and intermediate nylon content if the base polymer is 1,2 polybutadiene (casters, gears and the like) and as fibers at high or roughly 75% to 99% nylon content if the base polymer is 1,4 polybutadiene (tire cord textile fibers and the like).

In order that one may more fully appreciate the invention, the properties of specific copolymers made in accordance with the concepts of the present invention will be briefly discussed. When the base polymer is formed of 1,4 polybutadiene microstructure and the nylon polymer is formed from caprolactam, the weight range of nylon may vary from 5% to 95% of the total block polymer weight with the weight range of nylon from about 25% to about 75% being preferred. This preferred type of block copolymer has properties generally characteristic of nylon such as impact resistance, high abrasion resistance, toughness and yet exhibits definite processing properties characteristic of rubbery compounds. Hence, the compound is easily millable and processable. If desired, the nylon content can be in excess of 75% and the block copolymer employed as textile fibers and as tire cord. A block polymer of 1,2 polybutadiene type properties including high heat distortion and can be suitably used as a thermoset even when the nylon content is as high as 50 to 80%. Another block polymer formed from either styrene or α-methyl styrene and caprolactam with a nylon content in excess of 75% is advantageous for use as fibers and particularly for use as tire cords. It should thus be apparent from these specific examples that a vast number of possible nylon block, block copolymers can be made by using various types of compounds for each constituent and that a great number of tailor-made block copolymers for specific end uses are thus within the scope of the present invention. Furthermore, many of the various copolymers may be generally milled with conventional additives and fillers and cured with conventional curatives such as sulfur compounds or organic peroxides to impart further desirable properties.

It has been found that when a particular class of organic peroxides is used to cure the nylon block copolymers, the copolymers exhibit even further improved properties, especially when the base polymer constituent has a high vinyl content. These organic peroxides can be represented by the following formula:

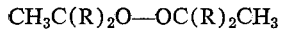

$$CH_3C(R)_2O-OC(R)_2CH_3$$

wherein R represents aryl or alkyl, including cycloalkyl, aralkyl, alkaryl, etc., of 1–20 carbon atoms, inclusive. Typical R groups include methyl, ethyl, propyl, butyl, hexyl, heptyl, decyl, dodecyl, octadecyl, phenyl tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, and the like.

The organic peroxides of the above formula may be diperoxides or mixed peroxides, that is, peroxides which have two different $CH_3C(R)_2O\cdot$ radicals. Specific examples include dicumyl peroxide, a preferred peroxide, ditertiarybutyl peroxide, tertiarybutyl-cumyl peroxide, ditertiarylamyl peroxide, tertiarylbutyl-tertiarylamyl peroxide, tertiaryamyl-cumyl peroxide, ditertiary-octyl peroxide, bis(1,1-diphenyl-ethyl) peroxide, bis(1,1 - dicyclohexyl-ethyl) peroxide, bis(1-cyclohexyl-1-methyl - ethyl) peroxide, bis(1-phenyl-1-ethyl-ethyl) peroxide, and the like. The symmetrical peroxides which have identical groups on each side of the peroxy oxygens are generally more available and therefore are preferred. However, mixed peroxides, when available, can be used very satisfactorily.

Whether mixed peroxides or diperoxides of the above class are used to impart to the block copolymers improved properties which are generally more favorable than if ordinary peroxides other than the above class were used, the peroxides used are advantageously those having a reasonably fast rate of decomposition at the temperature employed.

Copolymers containing unblocked or free nylons can also be made. Depending upon the amount of free nylon desired, the equivalent ratio of polyfunctional isocyanates to the lithium used in the formation of the base polymer is, of course, greater than 1 and such that completely unreacted polyisocyanates exist. When nylon block copolymers are made which contain free nylons, an additional co-catalyst such as sodium methoxide or sodium caprolatam is employed to help polymerize the lactams. The polymerization conditions with the exception of the equivalent ratio and the co-catalysts are generally the same as for the production of the nylon block copolymers. The existence of free nylon in nylon block copolymers generally does not hurt the properties of the thermoplastics, is usually helpful as a low molecular weight control and is useful in the production of fibers for tire cords.

The nylon block copolymers of the present invention can also be prepared in a suspension. The procedure followed is generally the same as described above to produce the nylon block copolymers except that the polymerization system is usually pressurized by the vapor pressure of the toluene or hydrocarbon base solvent. The preferable temperature of the polymerization is approximately 160–170° C. When a non-pressurized polymerization is carried out, generally, commercial solvents such a mesitylene and purified Isopar G are suitable. The suspension polymers produced can be separated from the solvent as by drum drying or the polymers can be precipitated, as for example, by using methanol and are generally employed in various application similar to the nylon block copolymers.

In addition to the various types of monomers used to make the base polymer, the base polymer, as previously noted, may be a copolymer such as styrene-butadiene. A nylon block copolymer having such a base polymer when cured will also exhibit the general properties and uses of the previously mentioned nylon block copolymers.

The invention will be more fully understood by referring to the following examples which describe the preparation of various nylon block copolymers. Caprolactam was used in all of the examples since it is readily available.

Example I.—Block Copolymer of Polycaprolactam/ 1,4 Polybutadiene (65/35)

To a clean dry 28 oz. beverage bottle was added 600 cc. of purified toluene, 42.4 g. of purified butadiene and 1.52 cc. of 1.64 molar ($2.5 \times 10^{-3}$ moles) butyl lithium in hexane solution. The bottle was stirred overnight with a magnetic stirrer. The bottle was then cooled to $-78°$ C. and 2.71 cc. of a 0.92 molar ($2.5 \times 10^{-3}$ moles) toluene diisocyanate solution in toluene was rapidly added. The solution was stirred for one hour before 77.6 g. of molten distilled caprolactam and 2.1 cc. of a 10% solution of phenyl-beta-naphthylamine (PBNA) in toluene was added. The solution was then heated and stirred in an oil bath while being purged with nitrogen. Upon reaching 170° C. the caprolactam had sufficiently polymerized so that stirring is no longer possible. The reaction was continued for 2 hours at 170° C. and then the bottle was cooled and broken to give a polymer with an intrinsic viscosity in 1:1 phenol-tetrachloroethane at 25° C. of 1.91 and was 4.7% water soluble. Milling 100 g. of this copolymer at 25° C. with 0.35 g. of dicumyl peroxide gave a material that could be cured in 20 minutes at 175° C. to give a rubber with the following properties: 135% elongation, 4650 p.s.i. tensile, 226 p.s.i. 5% modulus, 4000 p.s.i. 100% modulus, 91 Shore A hardness. This polymer showed a 210° C. DTA melting point.

Example II.—Block Copolymer of Polycaprolactam/ 1,4 Polybutadiene (50/50)

To a clean dry 28 oz. beverage bottle was added 600 cc. of purified toluene, 60 g. of purified butadiene and 1.83 cc. of 1.64 molar ($3 \times 10^{-3}$ moles) butyl lithium in hexane solution. The bottle was stirred overnight with a magnetic stirrer before 6.1 cc. of a 0.49 molar ($3 \times 10^{-3}$ moles) isophorone diisocyanate solution in toluene was rapidly added at 25° C. The solution was stirred for 1 hour before 60 g. of molten distilled caprolactam and 6.0 cc. of a 10% solution of PBNA in toluene was added. The bottle was then heated and stirred in an oil bath while being purged with nitrogen. Upon reaching 170° C. the caprolactam polymerization had begun and stirring was no longer possible. The reaction was continued for 3 hours at 170° C. and then the bottle was cooled and broken. Milling 100 g. of this copolymer with 5 g. of zinc oxide, 2 g. of sulfur, 2 g. of stearic acid and 1.2 g. of Santocure NS gave a material that could be cured at 150° C. for 30 minutes into a rubber that had the following properties: 127% elongation, 3875 p.s.i. tensile, 373 p.s.i. 5% modulus, 3775 p.s.i. 100% modulus and 91.5 Shore A hardness.

Example III.—Block Copolymer of Polycaprolactam/1,2 Polybutadiene (74/26)

To a clean dry 28 oz. beverage bottle was added 600 cc. of purified tetrahydrofuran, 31.4 g. of purified butadiene and 2.02 cc. of a 1.64 molar ($3.31 \times 10^{-3}$ moles) butyl lithium in hexane solution. The bottle was cooled to —20° C. and held at this temperature for 4 hours until the butadiene had polymerized. To this lithium polybutadiene which contained 85% 1,2-microstructure was added rapidly 2.70 cc. of a 1.22 molar ($3.31 \times 10^{-3}$ moles) toluene diisocyanate solution in toluene. The solution was stirred for 1 hour before 88.6 g. of distilled molten caprolactam and 1.6 cc. of a 10% solution of PBNA in toluene was added. The solution was then heated and stirred in an oil bath with a nitrogen purge. Upon reaching 170° C. the caprolactam polymerization had begun and stirring was no longer possible. The reaction was continued for 2 hours at 170° C. and then the bottle was cooled and broken to give a polymer with an intrinsic viscosity in 1:1 phenol-tetrachloroethane at 25° C. of 3.80 and was 1.70% water soluble. Milling 100 g. of this copolymer at 25° C. with 1.04 g. of dicumyl peroxide gave a material that could be cured for 3 hours at 145° C. into a thermosetting resin with the following properties: 9800 p.s.i. flexural strength, 243,000 p.s.i. flexural modulus, 2.35 ft. lbs./inch notch Izod impact strength, 7 inch lbs. falling dart impact strength (Gardner impact strength) 50E Rockwell hardness and 162° C. 264 p.s.i. heat distortion temperature.

Example IV.—Block Copolymer of Polycaprolactam/ Polystyrene (50/50)

To a clean dry 28 oz. beverage bottle was added 600 cc. of purified toluene, 80 g. of purified styrene and 1.63 cc. of 1.64 molar ($2.67 \times 10^{-3}$ moles) butyl lithium in hexane solution. The bottle was stirred overnight with a magnetic stirrer before 2.19 cc. of a 1.22 molar ($2.67 \times 10^{-3}$ moles) toluene diisocyanate solution in toluene was rapidly added. The solution was stirred for 1 hour before 80 g. of molten distilled caprolactam was added. Heating to 170° C. with a nitrogen purge for 3 hours gave a polymer with an intrinsic viscosity in 1:1 phenol tetrachloroethane at 25° C. of 2.36 and was 9.5% water soluble.

Example V.—Block Copolymer of Polycaprolactam/1,4 Polybutadiene (65/35) Containing Unblocked Polycaprolactam Using the same procedure as in Example I, except that 0.76 cc. of a 1.64 molar ($1.25 \times 10^{-3}$ moles) butyl lithium solution was used and before the polymerization of the caprolactam 0.57 cc. of a 6.58 molar ($3.75 \times 10^{-3}$ moles) sodium methoxide solution in methanol was added. A copolymer was produced that had at least 67% of the polycaprolactam unblocked. This copolymer had an intrinsic viscosity of 1.05 and was 1.4% water soluble and could be milled with the sulfur curatives listed in Example II to give the following properties: 206% elongation, 4250 p.s.i. tensil, 259 p.s.i. 5% modulus, 3025 p.s.i. 100% modulus and 91.5 Shore A hardness.

Example VI.—Block Copolymer of Polycaprolactam/1,2-Polybutadiene (35/65) Containing Unblocked Polycaprolactam To a clean dry 28 oz. beverage bottle was added 600 cc. of purified tetrahydrofuran 77.6 g. of purified butadiene and 1.52 cc. of 1.64 molar ($2.49 \times 10^{-3}$ moles) butyl lithium in hexane solution. The bottle was cooled to —20° C. and held at this temperature for 4 hours until the butadiene had polymerized. To the lithium polybutadiene which contained 85% of 1,2-microstructure was rapidly added 5.92 cc. of a 1.22 molar ($7.21 \times 10^{-3}$ moles) toluene diisoyanate solution in toluene. The solution was stirred for 1 hour before 42.4 g. of molten distilled caprolactam, 3.9 cc. of a 10% PBNA in toluene solution and 1.45 cc. of a 6.55 molar ($9.5 \times 10^{-3}$ moles) of lithium methoxide in methanol solution was added. The mixture was heated to 170° C. for 2 hours with a nitrogen purge to give a copolymer that had at least 79% of the polycaprolactam unblocked. This copolymer had an intrinsic viscosity of 1.11, was 2.9% water soluble and could be milled at room temperature with 2.6 parts of dicumyl peroxide per 100 parts of copolymer. After curing 3 hours at 145° C. the following properties were obtained: Flexural strength of 7,700 p.s.i., flexural modulus of 215,000 p.si., Izod impact of 1.34 ft. lbs./inch notch, falling dart impact of 1.75 inch lbs., Rockwell hardness of 71E and a 264 p.s.i. heat distortion temperature of 162° C. This sample had a crystalline melting point of 210° C. by DTA at 10° C./min.

Example VII.—Block Copolymer of Polycaprolactam/ 1,4 Polybutadiene (73/27) Prepared in Suspension To a clean dry 28 oz. beverage bottle was added 500 cc. of distilled mesitylene, 116 g. of purified butadiene and 7.25 cc. of a 1.64 molar ($1.19 \times 10^{-2}$ moles) butyl lithium in hexane solution. The bottle was stirred overnight at 25° C. on a magnetic stirrer before rapidly adding 9.30 cc. of a 1.28 molar ($1.19 \times 10^{-2}$ moles) toluene diisocyanate solution. This solution was stirred for 1 hour before 315 g. of molten distilled caprolactam and 11.6 cc. of a 10% PBNA solution was added. This solution was pressure transferred to a 2 liter resin kettle that had been previously thoroughly dried and purged with nitrogen. The solution was heated to 160° C. with rapid stirring and held at this temperature for 16 hours. The solution became opaque at about 130° C., indicating the onset of polymerization of the caprolactam. The final mixture was a finely divided suspension of 50% copolymer in mesitylene which showed almost no precipitation upon standing. The polymer was separated from the solvent by methanol precipitation to give a 25° C. millable copolymer with an intrinsic viscosity of 4.13.

Example VIII.—Block Copolymer of Polycaprolactam/ 1,2 Polybutadiene (71/29) Prepared in Suspension To a clean dry 28 oz. beverage bottle was added 600 cc. of purified Isopar G, 4.0 cc. of a 1.0 molar ($4 \times 10^{-3}$ moles) tetramethylethylene diamine solution in hexane, 31.4 g. of purified butadiene and after cooling to −25° C., 2.0 cc. of 1.64 molar (3.28×10⁻³ moles) butyl lithium in hexane solution was added. In 1 hour 77.6 g. of molten distilled caprolactam and 3.2 cc. of a 10% PBNA solution was added. This solution was then pressure transferred to a dry 2 liter resin kettle and was heated to 160° C. After 16 hours at 160° C. the reaction mixture consisted of an opaque suspension of the copolymer which would not readily separate. The polymer was precipitated in methanol to give a millable copolymer with an intrinsic viscosity of 4.10.

The elastomeric block copolymers produced by the present invention as noted above can be reinforced with conventional fillers such as silica ($SiO_2$), Novacite (smooth silica), and calcium carbonate with the silicas generally being preferred. Generally, a range from 75 to 225 parts of filler per 100 parts of block copolymer has been found to produce favorable results. The copolymers when cured by an organic peroxide, and especially When cured by an organic peroxide of the particular class noted above usually exhibits improved properties and improved heat distortion.

As a specific example of the improved properties, reference is made to the following table. The block copolymer of nylon 6/1,2 polybutadiene (74/26) having 83% vinyl structure was milled with 3 parts by weight of dicumyl peroxide to give, after 20 minutes of curing at 175° C., articles having the following properties:

| Filler | Silica | | Novacite | | Calcium carbonate | |
|---|---|---|---|---|---|---|
| | 100 | 200 | 100 | 200 | 100 | 200 |
| Vinyl triacitoxy silane | 2 | 4 | 2 | 4 | 2 | 4 |
| Flex str., p.s.i. ×10⁻³ | 13.05 | 14.01 | 11.12 | 11.59 | 9.59 | 7.17 |
| Flex mod., p.s.i.×10⁻⁵ | 4.93 | 4.08 | 4.74 | 7.84 | 5.61 | 8.43 |
| Izod: | | | | | | |
| Notched, ft.-lbs./in. | 0.49 | 0.52 | 0.70 | 0.45 | 0.39 | 0.44 |
| Unnotched, ft.-lbs./in. | | 5.1 | 7.1 | 6.2 | 3.5 | 1.53 |
| Gardner impact, in.-lbs. | 6.01 | 5.0 | 6.75 | 4.8 | 3.5 | 1.75 |
| Rockwell E | 60 | 71.4 | 65 | 78.5 | 54.5 | 55 |
| Heat dist. temp., ° C. at 264 p.s.i | 220 | 215 | 180 | (¹) | 214 | 215 |

¹ Broke at 111.

When the same block copolymer and ingredients were cured at 145° C. for 3 hours, the following properties were obtained:

| Filler | Silica | | Novacite | | Calcium carbonate | |
|---|---|---|---|---|---|---|
| | 100 | 200 | 100 | 200 | 100 | 200 |
| Vinyl triacitoxy silane | 2 | 4 | 2 | 4 | 2 | 4 |
| Flex str., p.s.i.×10⁻³ | 13.53 | 13.70 | 14.22 | 15.43 | 10.00 | 7.17 |
| Flex mod., p.s.i.×10⁻⁵ | 4.97 | 7.85 | 5.00 | 8.83 | 5.51 | 9.32 |
| Izod: | | | | | | |
| Notched, ft.-lbs./in. | 0.53 | 0.52 | 0.44 | 0.36 | 0.37 | 0.38 |
| Unnotched, ft.-lbs./in. | | | | 6.02 | 3.7 | 0.89 |
| Gardner impact, in.-lbs. | 6.0 | 6.0 | 9.5 | 8.0 | 3.75 | 3.0 |
| Rockwell E | 66 | 75 | 68 | 91 | 58 | 61 |
| Heat dist. temp., ° C. at 264 p.s.i | 219 | | 198.5 | | 220 | |

Improved properties were also obtained when 150 parts of silica and 3 parts of vinyl triacetoxy silane were added to the above nylon block copolymer and cured with varying amounts of dicumyl peroxide at either 175° C. for 20 minutes or at 145° C. for 3 hours.

Yet another example of the improved properties is shown by the following table where the copolymer, nylon 6/1,2 polybutadiene, 90% vinyl structure, was milled with varying amounts of silica and dicumyl peroxide to give, after 20 minutes of curing at 175° C., the following properties:

| Sample number | 1 | 2 | S-1 | S-2 |
|---|---|---|---|---|
| Silica, pts | 0 | 0 | 150 | 150 |
| Dicumyl peroxide, pts | 1 | 2 | 1 | 2 |
| Flex str., p.s.i. ×10⁻³ | 6.15 | 6.27 | 10.39 | 11.70 |
| Flex mod., p.s.i. ×10⁻⁵ | 1.46 | 1.52 | 5.34 | 6.09 |
| Izod: | | | | |
| Notched, ft.-lbs./in | 1.2 | 0.9 | 0.6 | 0.65 |
| Unnotched, ft.-lbs./in | 9.8 | 7.1 | 5.0 | 4.6 |
| Gardner impact, in.-lbs | 9.0 | 7.3 | 20.3 | 11.0 |
| Rockwell E | 47.5 | 53.5 | 49 | 57 |

UREA

The isocyanate terminated polymers of the polymeric composition can be reacted with a urea constituent or urea forming monomers to produce novel urea block copolymers. The urea block copolymers produced generally exhibit good processable properties at temperatures below the melt temperatures of the urea constituent.

The urea constituent of the block copolymer can be prepared by reacting water or a diamine which, of course, contain an active hydrogen with a polyisocyanate. Conveniently, the polyisocyanate monomers may be contained in the base polymeric composition and are generally the same polyfunctional isocyanates which are reacted with the alkali metal terminated base polymers. To provide for the presence of completely free or unreacted polyisocyanate monomers in addition to the isocyanate terminated polymers, the base polymeric composition is prepared as previously described except that the equivalent ratio of the polyisocyanates to the alkali metal is usually much greater than the aforementioned range of 1.1 to about 20.0. In general, the equivalent ratio is very large such as on the order of 70 to 1 and it is not unusual to have an equivalent ratio as large as 150 to 1. Determination of the equivalent ratio for a particular block polymer will largely be governed by the amount of the urea constituent in the block copolymer since a copolymer having a larger urea constituent will, naturally, require a greater amount of unreacted polyisocyanate monomer.

In order that the isocyanate terminated base polymers do not react with compounds containing active hydrogens such as alcohol or acids with the exception of the monomer but remain free to be blocked to a urea constituent, it is generally important that the process of formation and polymerization of the isocyanate terminated base polymers be carried out in an environment substantially free from active hydrogens such as in an inert nitrogen atmosphere. It should be understood, however, that a small amount of active hydrogen may be present provided that a sufficient number of isocyanate terminated base polymers may be reacted to produce a block copolymer having desirable properties. Water is an active hydrogen compound which is an exception to the foregoing when, of course, water is used to form urea.

It is desirable that the equivalent ratio of the polyisocyanates to the water or diamines be approximately 1. When the polyisocyanate monomers are diisocyanates, the resultant block copolymer will generally be of the B-U-B

| | Temperature, ° C. | | | | | | | |
|---|---|---|---|---|---|---|---|---|
| | 175 | | | | 145 | | | |
| Dicumyl peroxide, pts | 1 | 2 | 3 | 4 | 1 | 2 | 3 | 4 |
| Flex str., p.s.i.×10⁻³ | 14.14 | 13.00 | 12.47 | 13.16 | 13.04 | 13.03 | 12.88 | 12.75 |
| Flex mod., p.s.i.×10⁻⁵ | 6.60 | 6.28 | 6.68 | 6.53 | 6.26 | 6.01 | 6.29 | 5.90 |
| Izod: | | | | | | | | |
| Notched, ft.-lbs./in | 0.47 | 0.58 | 0.59 | 0.52 | 0.56 | 0.55 | 0.43 | 0.62 |
| Unnotched, ft.-lbs./in | 5.5 | 5.5 | 4.4 | 3.3 | 6.0 | 4.3 | 5.7 | 4.9 |
| Gardner impact, in.-lbs | 6.0 | 5.6 | 5.5 | 5.3 | 6.9 | 6.6 | 7.0 | 6.0 |
| Rockwell E | 63.5 | 73 | 69 | 72 | 64 | 73 | 73 | 75 |
| Heat dist. temp., ° C. at 264 p.s.i | 208 | 216 | 221 | 217 | 215 | 229 | 215 | 215 | type where B represents a base polymer and U represents a urea polymer. When the polyisocyanate monomers are triisocyanates, the resultant copolymer will generally be a gel and a cross-linked entity due to the additional reactive sites provided by the triisocyanates. Since this entity is difficult to process, the use of triisocyanates is generally not favored. Should the equivalent ratio be either greatly above or below 1, only B-U type urea block copolymer and free polyurea will usually be formed. Generally, compositions containing a large amount of B-U-B type urea block copolymers are desirable and thus diisocyanates are preferred.

The temperature range in which the polymerization is carried out is generally from 0° to 260° C. and preferably from 70° to 180° C. Generally, the polymerization of the polyisocyanates and the diamines is rapid and does not require a catalyst. However, since the reactive systems which will result in the formation of a urea block copolymer are generally heterogeneous mixtures, the viscosity of the media influences the reaction rate such that a catalyst may be desirous. Upon the termination of the polymerization due often to the increase in the viscosity of the system, the urea block copolymer will generally exist in a suspension. The block copolymer, however, may be coagulated and precipitated by a fluid such as methanol which is not a solvent for the base portion of the block copolymer.

The polyisocyanate monomers which may be used in the polymerization are the same as those previously listed for reaction with the alkali earth terminated base polymers. Of course, as obvious to one skilled in the art, the previous listed polyisothiocyanates may be used in lieu of polyisocyanates thereby forming thiourea copolymers.

The diamines suitable for use are the compounds represented by the formula $NH_2$—R—$NH_2$ where R is an aliphatic containing from 2 to about 20 carbon atoms, a cycloaliphatic containing from 4 to about 20 carbon atoms or an aromatic containing from 6 to about 20 carbon atoms. Examples of diamines include ethylenediamine, tetramethylenediamine, pentamethylenediamine, ortho-phenylenediamine, para-phenylenediamine, 2,6-toluenediamine, 4,5-diethyl-o-phenyldiamine, and meta-xylylenediamine. Preferred diamines include hexamethylene diamine and meta-phenylenediamine.

Instead of a diamine, water may be used since it reacts with the polyisocyanates and the terminated isocyanate base polymers to form a urea block copolymer. However, when water is used, the reaction is generally slow and catalysts are often desirable. Generally, catalysts suitable for promoting the formation of urethane polymers are also generally suitable for promoting the formation of the urea constituent in the present invention and such catalysts are well known to those skilled in the art. For example, tertiary amines which are conventional urethane catalysts may be used and generally their catalytic strength is in proportion to their base strength except when steric hindrance interferes. An exception is triethylenediamine (1,4-diaza[2,2,2]bicyclooctane), a preferred catalyst, which is much more powerful than would be predicted from its base strength due probably to its complete lack of steric hindhance. A large number of metallic compounds constitute another class of catalysts and generally these catalysts are powerful enough to promote "one shot" processes. Of the various members of this class, the organotins are favored. Specific examples of suitable organotins include tetra-n-butyltin acetate, n-butyltin trichloride, trimethyltin hydroxide, dimethyltin dichloride and tributyltin acetate. A preferred organotin is di-n-butyltin dilaurate.

Depending upon the particular end use requirements of the block copolymer, the weight percent of the urea constituent may generally vary from 5 to 95% of the total weight of the block copolymer and preferably from 25 to 75%. In such block copolymers, the favorable properties of polyurea such as high modulus are usually retained.

When the base polymer constituent is 1,4 polybutadiene or polyisoprene, the urea block copolymer may be used as tire rubber and as an adhesive for bonding rubber to urethanes. Furthermore, it has been found that such block copolymers can be reinforced with carbon black. When the base polymer constituent is made from any of the other monomers previously described, the block urea copolymers may be cured in any conventional manner and generally have properties similar to reinforced cured rubber. Thus, the block copolymers may be used in applications where rubber is used such as in tires, belting, hose and molded goods. Regardless of the nature of the base polymer constituent, the block copolymers also generally have markedly improved processability below the melt temperature of the urea constituent.

As previously noted, the base polymer may be a homopolymer, a copolymer or a block copolymer. Thus, the base polymer constituent of the urea block copolymer may be a copolymer such as styrene-butadiene. A urea block copolymer having such a base polymer when cured exhibits properties and uses similar to reinforced cured rubber as well as improved processability at temperatures below the melt temperature of the urea constituent.

The invention will be more fully understood by referring to the following examples which describe the preparation and properties of the various urea block copolymers.

Example I

Sixty-two grams of butadiene was added to 500–600 cc. of dry toluene in a 28 oz. beverage bottle. To this, 0.75 cc. of 1.51 M butyl Li (1.13 mM.) in hexane was added and polymerization was allowed to proceed overnight at room temperature. Conversion was quantitative. 14.2 cc. of 7.03 M toluene diisocyanate (0.1 mole) was then added and stirred for 1 hour at room temperature. To this, 11.3 g. of molten m-phenylenediamine (0.105 mole) was added and the bottle was placed in a 80° polymerizing bath for 3–6 days. At the end of this time, the copolymer was worked up in methanol and isolated. Conversion was quantitative.

The copolymer was then milled at 150° F. in the following recipe:

| | |
|---|---|
| Copolymer | 100 |
| Sulfur | 2 |
| Zinc oxide | 5 |
| Stearic acid | 2 |
| Santocure NS | 1.2 |
| Oil | 9 |

The compounded resin was cured at 300° F. for 30 minutes to give the following properties:

| | |
|---|---|
| Hardness Shore A | 52 |
| Ultimate elongation, percent | 650 |
| Modulus, p.s.i.: | |
| 5 | 35 |
| 100 | 175 |
| 200 | 250 |
| 300 | 375 |
| 400 | 575 |
| 500 | 925 |
| Break | 1600 |

Example II

Sixty-two grams of butadiene was added to 500–600 cc. of dry toluene in a 28 oz. bottle. To this, 0.50 cc. of 1.51 M butyl Li (0.75 mM.) in hexane was added and polymerization was allowed to proceed overnight at 30° C. Conversion was quantitative. 12.8 cc. of 7.03 M toluene diisocyanate (.09 mole) was then added and allowed to react for one hour at room temperature. To this, 10.8 g. (0.10 mole) of molten m-phenylenediamine was added and the bottle was placed in an 80° C. polymerization bath for 3–6 days. At the end of this time the copolymer was recovered by work up in methanol. Conversion was quantitative.

The copolymer was milled at 150° F. in the following recipes:

|  | A | B | C | D |
|---|---|---|---|---|
| Copolymer | 100 | 100 | 100 | 100 |
| Sulfur | 2 | 2 | 2 | 2 |
| Zinc oxide | 5 | 5 | 5 | 5 |
| Santocure NS | 1.2 | 1.2 | 1.2 | 1.2 |
| Stearic acid | 2 | 2 | 2 | 2 |
| Oil | 34 | 34 | 34 | 34 |
| ISAF black | 0 | 15 | 25 | 40 |

The compounded resins were cured at 300° F. for 30 minutes to give the following properties:

| Sample | Hardness, Shore A | Ultimate elongation percent | Modulus, p.s.i. | | | | | |
|---|---|---|---|---|---|---|---|---|
| | | | 5 | 100 | 200 | 300 | 400 | Break |
| A | 47 | 410 | 26 | 100 | 175 | 325 | | 525 |
| B | 59 | 415 | 65 | 225 | 500 | 925 | 1,500 | 1,625 |
| C | 69 | 270 | 103 | 500 | 1,050 | | | 1,600 |
| D | 83 | 195 | 203 | 1,000 | | | | 1,860 |

Example III

Fifty grams of butadiene was added to 500–600 cc. of dry toluene in a 28 oz. beverage bottle. To this, 0.28 cc. of 1.51 M butyl Li (0.42 mM.) in hexane was added and polymerization was allowed to proceed at 30° C. overnight. Conversion was quantitative. 9.95 cc. of 7.03 M toluene diisocyanate (0.07 mole) was then added and stirred for one hour at 30° C. To this, 9.3 g. of molten hexamethylene diamine (0.08 mole) was added and the bottle was placed in an 80° C. oven for 2–16 hours. At the end of this time the copolymer was recovered by work-up in methanol. Conversion was quantitative.

The copolymer was milled at 150° F. in the following recipes:

|  | A | B |
|---|---|---|
| Copolymer | 100 | 100 |
| Sulfur | 1.4 | 1.4 |
| Zinc oxide | 3.5 | 3.5 |
| Stearic acid | 1.4 | 1.4 |
| Santocure NS | .84 | 0 |

The compounded resins were cured at 300° F. for 30 minutes to give the following properties:

| Sample | Hardness, Shore A | Ultimate elong., percent | Modulus, p.s.i. | | | | | |
|---|---|---|---|---|---|---|---|---|
| | | | 5 | 100 | 200 | 300 | 400 | 500 | Break |
| A | 74 | 280 | 171 | 375 | 500 | | | | 600 |
| B | 73 | 535 | 164 | 375 | 500 | 650 | 875 | 1,125 | 1,200 |

Example IV.—Block Copolymer of Polybutadiene/Urea (70/30) Made With Water

Fifty-one grams of butadiene were added to 500–600 cc. of dry toluene in a 28 oz. beverage bottle. To this, 0.56 cc. of 1.57 M butyl Li (88 mM.) in hexane was added and polymerization was allowed to proceed at 25° C. overnight. Conversion was quantitative. To this, 19.2 cc. of 7.03 M toluene diisocyanate (135 mM.) was added and allowed to react for 1 hour. Now 2.44 cc. of distilled water (135 mM.) was added along with 0.1 cc. of dibutyltindilaurate (DBTDL). The bottle was placed in an 80° C. bath overnight. At the end of this time the copolymer was recovered by work-up in methanol. Conversion was quantitative.

The copolymer was compounded on a mill according to the following recipe:

RECIPE BASED ON 100 PARTS OF COPOLYMER

| Sample number | S | ZnO | Stearic acid | Accelerator | Carbon black |
|---|---|---|---|---|---|
| 1 | 2 | 5 | 2 | 1.2 | 0 |
| 2 | 2 | 5 | 2 | 1.2 | 15 |

The compounded copolymers were cured at 300° F. for 30 minutes to give the following properties:

| Sample number | Hardness, Shore A | Elong., percent | Modulus, p.s.i. | | | | |
|---|---|---|---|---|---|---|---|
| | | | 5 | 100 | 200 | 300 | Break |
| 1 | 76 | 385 | 92 | 400 | 625 | 975 | 1,390 |
| 2 | 84 | 340 | 155 | 625 | 1,125 | 1,850 | 2,150 |

Example V.—Block Copolymer of Styrene-Butadiene/Urea (70/30)

To 500 cc. of dry toluene, 15.2 g. of styrene and 46.6 g. of butadiene were added. This was followed by 0.22 cc. of 1.0 molar hexamethylphosphoramide (HMPA) randomizing agent and 0.56 cc. of 1.57 molar butyl lithium. Polymerization was allowed to proceed overnight at room temperature. Now 12.8 cc. of 7.03 molar toluene diisocyanate was added and the reaction allowed to proceed for 1 hour at room temperature. To this, 9.5 cc. of molten m-phenylenediamine was added and the bottle placed in an 80° C. bath overnight. Conversion was quantitative. Spectroscopic analysis of this copolymer showed it to have about 45% 1,2 repeat units in the polybutadiene segments.

The copolymer was compounded on a mill according to the following recipe:

RECIPE BASED ON 100 PARTS OF COPOLYMER

| Sample number | S | ZnO | Stearic acid | Accelerator | Carbon black |
|---|---|---|---|---|---|
| 1 | 2 | 5 | 2 | 1.2 | 0 |
| 2 | 2 | 5 | 2 | 1.2 | 15 |

The compounded copolymers were cured at 300° F. for 30 minutes to give the following properties:

| Sample number | Hardness, Shore A | Elong., percent | Modulus, p.s.i. | | | | |
|---|---|---|---|---|---|---|---|
| | | | 5 | 100 | 200 | 300 | Break |
| 1 | 75 | 345 | 98 | 325 | 575 | 1,100 | 1,475 |
| 2 | 83 | 380 | 158 | 475 | 900 | 1,700 | 2,400 |

Example VI.—Block Copolymer of Styrene-Butadiene/Urea (70/30)

To 500 cc. of dry toluene, 15.4 g. of styrene and 46.8 g. of butadiene were added. This was followed by 0.10 cc. of 1.0 molar hexamethylphosphoramide (HMPA) randomizing agent and 0.56 cc. of 1.57 M butyl lithium. Polymerization was allowed to proceed overnight at room temperature. Now 12.8 cc. of 7.03 molar toluene diisocyanate was added and the reaction was allowed to proceed for 1 hour at room temperature. To this 9.5 cc. of molten m-phenylenediamine was added and the bottle placed in an 80° C. bath overnight. Conversion was quantitative. Spectroscopic analysis showed the butadiene portion of this copolymer to contain about 34% 1,2 units.

The copolymer was compounded on a mill according to the following recipe:

RECIPE BASED ON 100 PARTS OF COPOLYMER

| Sample number | S | ZnO | Stearic acid | Accelerator | Carbon black |
|---|---|---|---|---|---|
| 1 | 2 | 5 | 2 | 1.2 | 0 |
| 2 | 2 | 5 | 2 | 1.2 | 15 |

The compounded copolymers were cured at 300° F. for 30 minutes to give the following properties:

| Sample number | Hardness, shore A | Elong., percent | Modulus, p.s.i. | | | |
|---|---|---|---|---|---|---|
| | | | 5 | 100 | 200 | Break |
| 1 | 76 | 275 | 89 | 300 | 500 | 700 |
| 2 | 89 | 245 | 197 | 600 | 1,175 | 1,475 |

URETHANE

The isocyanate terminated polymers of the polymeric composition can be reacted with a urethane constituent or urethane forming monomers to produce novel urethane block copolymers. Additionally, the urethane constituent itself may be a block copolymer such as urethane-urea. This type of urethane block copolymer as well as the urethane block copolymers containing a homopolymer urethane constituent generally exhibit good processability at temperatures below the melt temperatures of the urethane constituent.

The urethane constituent of the block copolymer generally contains a significant number of urethane groups regardless of what the rest of the molecule may contain. Generally, the urethane constituent may be prepared by reacting any of the previously mentioned polyfunctional isocyanates which are reacted with the alkali metal terminated base polymers with polyhydroxy compounds which have at least two hydroxyl groups. As is obvious to one skilled in the art, the previously mentioned polyisothiocyanates may be used in lieu of polyisocyanates thereby forming thiourethane copolymers.

Examples of polyhydroxy compounds which, of course, generally contain an active hydrogen include the di- and polyhydric alcohols, the di- and polyhydric phenols, the polyethers, the polyesters, the polylactone diols and castor oil. Compounds containing groups such as amino and carboxyl may also be used. Thus, a typical urethane block copolymer may contain, in addition to the urethane groups in the urethane constituent, aliphatic and aromatic hydrocarbon residues, ester, ether, amide and urea groups.

Suitable di- and polyhydric alcohols which may be reacted with polyisocyanates include the conventional alcohols which are commonly used in the formation of urethanes and in general the di- and polyhydric alcohols which contain from 2 to 30 carbon atoms where the alcohol is an aliphatic and from 4 to 30 carbon atoms where the alcohol is a cycloaliphatic. Specific examples of dihydric alcohols include primary and secondary diols such as ethylene glycol; 1,2-propanediol; 1,4-butanediol; 1,6-hexanediol; 1,3-butanediol; 1,2-butanediol; 2,3-hexane diol; 3,4-hexanediol and 2,5-hexanediol. An example of a specific cyclo alcohol is 1,2-cyclopentanediol. Di- and polyhydric phenols containing from 6 to 30 carbon atoms may also be used although they tend to react more slowly than do the alcohols. Examples of di- and polyhydric phenols include catechol, resorcinol, quinol, pyrogallol, phloroglucinol, 1,2,4-trihydroxy benzene and 1,2,3-trihydroxybenzene.

The polyethers are another large class of polyhydroxy compounds which may be reacted with polyisocyanates to form the urethane constituent of the block copolymer. In general, any of the polyethers which are used in the formation of urethanes may be used to form the urethane constituent of the block copolymer. Examples of polyethers include those derived from propylene oxide and/or ethylene oxide as well as the poly(oxyalkylene) derivatives of polyhydric alcohols such as glycerol, 2-ethyl-2 hydroxymethyl-1,3-propanediol, 1,2,6-hexanetriol and sorbitol. Additional polyethers which may be used include the poly(oxypropylene) triols and the polyethers which have greater than three hydroxy groups such as those made from the polyols of sorbitol, mannitol, pentaerythritol, and sucrose. A preferred group of polyethers are the polytetramethyleneoxide glycols which, of course, are prepared by the polymerization of tetrahydrofuran.

The polyesters constitute yet another class of polyhydroxyl compounds which may be used to form the urethane constituent of the block copolymer and generally any polyester which is used in the formation of urethane polymers may be used to form the urethane constituent of the block copolymer. Typical monomers used to prepare polyesters for the urethane constituent include adipic acid, phthalic anhydride, ethylene glycol, propylene glycol, 1,3-butylene glycol, 1,4-butylene glycol and diethylene glycol. For preparation of branched polyesters, triols such as 1,2,6-hexantriol, trimethylolpropane and 2-hydoxylmethyl-2-methyl-1,3-propanediol may be used. Also, lactones such as caprolactone have been used to prepare polyesters. As apparent to one skilled in the art, it is desirable to use polyesters which contain only hydroxyl groups as reactive sites and hence polyesters which have very low acid numbers and very low water content are preferred.

The polylactone diols constitute yet another class of polyhydroxyl compounds which may be used to form the urethane constituent of the block copolymer. The lactones used in the preparation of the polylactone diols contain at least 2 carbon atoms and generally up to 15. Examples of specific lactones include caprolactone and capyllactone. The polylactone diols made from caprolactone are preferred in the present invention.

Yet another compound which may be reacted with the polyisocyanates to form the urethane constituent of the block copolymer is castor oil. Usually castor oil is transesterfied with a polyhydroxy compound such as glycerol to form a combination of glycerides which polyhydroxy compounds can then be reacted with polyiscoyanates.

Conveniently, the polyisocyanate monomers which are to be reacted with the polyhydroxy compounds to form the urethane constituent of the block copolymer may be contained in the base polymeric composition. To provide for the presence of completely free or unreacted polyisocyanate monomers in addition to the isocyanate terminated base polymers, the base polymeric composition is prepared as previously described except that the equivalent ratio of the polyisocyanates to the alkali metal is generally much greater than the aforementioned range of 1.1 to about 20.0. In general, the equivalent ratio is very large such as on the order of 70 to 1 and it is not uncommon to have an equivalent ratio as large as 150 to 1. Determination of the equivalent ratio for a particular block copolymer will largely be governed by the amount of the urethane constituent in the block copolymer since a copolymer having a large urethane constituent will, naturally, require for its formation a large amount of unreacted or free polyisocyanate monomer.

In order that the isocyanate terminated base polymers do not react with compounds containing active hydrogens such as water, alcohol or acids, with the exception of the monomer, but remain free to be blocked to a urethane constituent, it is generally important that the process of formation and polymerization of the isocyanate terminated base polymers be carried out in an environment substantially free from active hydrogens such as in an inert nitrogen atmosphere. It should be understood however, that a small amount of active hydrogen may be present provided that a sufficient number of isocyanate terminated base polymers may be reacted to produce a block copolymer having desirable properties.

It is desirable that the equivalent ratio of the polyisocyanates to the polyhydroxy compounds be approximately 1. When the polyisocyanate monomers are diisocyanates, the resultant block copolymer will generally be of the B-U-B type where B represents a base polymer and U represents a urethane polymer. When the polyisocyanate monomers are triisocyanates, the resultant copolymer will generally be a gel and a cross-linked entity due to the additional reactive sites provided by the triisocyanates. Since this entity is difficult to process, the use of triisocyanates, is generally not favored. Should the equivalent ratio be either greatly above or below 1, only B-U type and free polyurethane will usually be formed. Generally, compositions containing a large amount of B-U-B type urethane block copolymers are desirable and thus diisocyanates are preferred.

Catalysts are often used to promote the formation of the urethane constituent of the block copolymer. The catalysts suitable for promoting the formation of urethane polymers are also generally suitable for promoting the formation of the urethane constituent in the present invention and such catalysts are well known to those skilled in the art. For example, tertiary amines which are conventional urethane catalysts may be used and generally their catalytic strength is in proportion to their base strength except when steric hindrance interferes. An exception is triethylenediamine (1,4-diaza[2,2,2]bicyclooctane), a preferred catalyst, which is much more powerful than would be predicted from its base strength due probably to its complete lack of steric hindrance. A large number of metallic compounds constitute another class of catalysts and generally these catalysts are powerful enough to promote "one shot" processes. Of the various members of this class, the organotins are favored. Specific examples of suitable organotins include tetra-n-butyltin acetate, n-butyltin trichloride, trimethyltin hydroxide, dimethyltin dichloride and tributyltin acetate. A preferred organotin is di-n-butyltin dilaurate.

The temperature range in which the polymerization is carried out is generally between 20 and 100° C. Although through the selection of the temperature, the polyisocyanate and the polyhydroxy compound, the reaction can be controlled to a large extent, the choice of a catalyst can often give much broader control. In fact, the catalytic effect of some catalysts are so powerful that they often override the influences of the reactants and therefore such catalysts are often used to control the reaction. One such group of catalysts, as is well known to those skilled in the art, are the aforementioned organatins which contain from 1 to 8 carbon atoms.

Depending upon the particular end use requirements of the block copolymer, the weight percent of the urethane constituent may generally vary from 5 to 95% and preferably from 25 to 75% in such block copolymers. Moreover, the general properties of the urethanes such as good abrasion resistance and flexibility are usually retained and it has been found that such block copolymers can be reinforced with carbon black. When the base polymer constituent is 1,4-polybutadiene or polyisoprene, the urethane block copolymer can be used as tire rubber. When the base polymer constituent is made from any of the other monomers previously described, the block urethane copolymers may be cured in any conventional manner and generally have properties very similar to reinforced cured rubber. Thus, the block copolymers may be used for items such as tires, rubber goods, molded goods and heavy duty industrial finishes where chemical, abrasion and corrosion resistance are desired, and in short, for any items wherein rubber is commonly used. Regardless of the nature of the base polymer constituent, the block copolymers also generally have markedly improved processability below the melt temperature of the urethane constituent. Furthermore, the physical properties of the urethane block copolymers including the properties when carbon black is used as a reinforcing agent are generally similar to the aforementioned urea block copolymers.

In addition to the various different types of monomers used to make the base polymer, the base polymer as previously noted may be a copolymer such as styrene-butadiene. A urethane block copolymer having such a base polymer will also generally exhibit the properties and uses of reinforced cured rubber as well as have improved properties below its melt temperature.

The urethane constituent in lieu of a homopolymer may be a copolymer such as a urethane-urea copolymer. Thus, in addition to the polyfunctional isocyanates and polyhydroxy compounds, the process will contain diamines, an active hydrogen compound. Of course, the equivalent ratio of polyfunctional isocyanates to the polyhydroxyl and diamines should be 1 and the preparation is generally the same as for the homopolymer urethane constituent. The diamines suitable for use are the compounds represented by the formula $NH_2$—R—$NH_2$ where R is an aliphatic containing from 2 to about 20 carbon atoms, a cycloaliphatic containing from 4 to about 20 carbon atoms or an aromatic containing from 6 to about 20 carbon atoms. Examples of diamines include ethylenediamine, tetramethylenediamine, pentamethylenediamine, ortho-phenylenediamine, para-phenylenediamine, 2,6-toluenediamine, 4,5-diethyl-o-phenyldiamine, and meta-xylylenediamine. Preferred diamines include hexamethylene diamine and metaphenylenediamine.

Generally, this type of urethane block copolymer will have properties and uses very similar to a urethane block copolymer wherein the urethane constituent is a homopolymer and may be reinforced with carbon black.

The invention will be more fully understood by referring to the following examples which describe the preparation and properties of the various urethane block copolymers.

Example I.—Block Copolymer of Polybutadiene/Urethane (30/70)

To a clean dry 28 oz. beverage bottle was added 600 cc. or purified toluene, 40 g. of purified butadiene and 0.38 cc. of 1.75 molar butyl lithium in hexane solution. The bottle was stirred magnetically overnight at 25° C. before rapidly adding 12.8 cc. of 7.03 molar toluene diisocyanate (0.09 moles). This solution was stirred for 1 hour before 76.5 g. (0.09 moles) of Niax 520 (polycaprolactone—molecular weight 850 g./mole) and 0.1 cc. of dibutyltindilaurate was added. This solution was placed in a polymerizing bath at 80° C. overnight. The final mixture was a viscous suspension which showed no sign of settling upon standing for days. The copolymer was separated from solvent by precipitation with methanol to give a tough rubbery material.

Example II.—Block Copolymer of Polybutadiene/Urethane (50/50)

To a clean dry 28 oz. beverage bottle was added 600 cc. of purified toluene, 51 g. of purified butadiene and 0.50 cc. of 1.75 molar ($0.875 \times 10^{-3}$ moles) butyl lithium in hexane solution. The bottle was stirred magnetically overnight at 25° C. before rapidly adding 9.25 cc. of 7.03 molar (0.065 moles) toluene diisocyanate. This solution was stirred for 1 hour before 39.6 g. (0.65 moles) of Polymeg 610 (polytetramethyleneoxide—molecular weight 610 g./mole) and 0.1 cc. of dibutyltindilaurate was added. This solution was placed in a polymerizing bath at 80° C. overnight. The final mixture was a viscous solution. The copolymer was recovered by methanol precipitation to give a tacky rubber-like material.

Example III.—Block Copolymer of Polybutadiene/Urethane (70/30)

To a clean dry 28 oz. beverage bottle was added 600 cc. of purified toluene, 51 g. of purified butadiene and 0.50 cc. of 1.75 molar ($0.875 \times 10^{-3}$ moles) butyl lithium in hexane solution. The bottle was stirred magnetically overnight at 25° C. before rapidly adding 2.98 cc. of 7.03 molar (0.021 moles) toluene diisocyanate. This solution was stirred for 1 hour before 17.8 g. (0.021 moles) of Niax 520 (polycaprolactone—molecular weight 850 g./mole) and 0.1 cc. of dibutyltindilaurate was added. This solution was placed in a polymerizing bath at 80° C. overnight. The final mixture was a viscous suspension which showed no sign of settling upon standing for days. The copolymer was separated from solvent by precipitation with methanol to give a tough rubbery material.

Example IV.—Block Copolymer of Polybutadiene/Urethane (70/30)

To 500 cc. of dry toluene, 50.1 g. of butadiene was added followed by 0.56 cc. of 1.57 molar butyl lithium. Polymerization was allowed to proceed overnight at room temperature. 11.0 cc. of 7.03 M toluene diisocyanate was then added and allowed to react for 1 hour. This was followed by 8.5 cc. of pentane diol and 0.1 cc. of pyridine catalyst. The bottle was then transferred to an 80° C. polymerization bath and allowed to react overnight. Conversion was quantitative.

The copolymer was compounded on a mill according to the following recipe:

Recipe based on 100 parts of copolymer:
```
S ------------------------------------ 1.4
ZnO ---------------------------------- 3.5
Stearic acid ------------------------- 1.4
Accelerator --------------------------  .84
```

When cured at 300° F. for 30 minutes the following results were obtained:

```
Hardness (Shore A) ------------------- 70
Elong. (percent) --------------------- 160
```

Modulus, p.s.i.:
```
5 ------------------------------------ 44
100 ---------------------------------- 275
Break -------------------------------- 425
```

Example V.—Block Copolymer of Polybutadiene/Urea-Urethane (70/30)

To 500 cc. of dry toluene, 50.2 g. of butadiene was added. This was followed by 0.5 cc. of 1.75 molar butyl lithium. Polymerization was allowed to proceed overnight at room temperature. To this 10.76 cc. of 7.03 molar toluene diisocyanate was added and allowed to react for 1 hour. 5.5 cc. of molten hexamethylenediamine and 4.2 cc. of pentane diol were then added. About 0.1 cc. of pyridine was added as catalyst. The bottle was placed in an 80° C. bath for 24 hours. Conversion was quantitative.

This copolymer was compounded on the mill in the following recipe:

Recipe based on 100 parts of copolymer:
```
S ------------------------------------ 2
ZnO ---------------------------------- 5
Stearic acid ------------------------- 2
Accelerator -------------------------- 1.2
```

When cured at 300° F. for 30 minutes the following properties were obtained:
```
Hardness (Shore A) ------------------- 70
Elong. (percent) --------------------- 320
```
Modulus, p.s.i.:
```
5 ------------------------------------ 46
100 ---------------------------------- 275
200 ---------------------------------- 450
300 ---------------------------------- 775
Break -------------------------------- 890
```

IMIDE

The isocyanate terminated polymers of the polymeric composition can be reacted with an imide constituent or imide forming monomers to produce novel imide block copolymers. The imide block copolymers produced generally exhibit the same properties as that of conventional imide polymers and also possess greatly improved processing properties in that they are readily millable and moldable at temperatures well below the melting point of conventional imide polymers.

The imide constituent of the block copolymer is produced by the chemical reaction of an aromatic dianhydride and an aromatic diamine or an alkl diamine which, of course, contain an active hydrogen. Examples of aromatic dianhydrides include pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4 - dicarboxyphenyl) sulfone dianhydride; 3,4,9,10-perylene tetracarboxylic acid dianhydride; bis(3,4-dicarboxyphenyl) ether dianhydride; 3,4,3',4'-benzophenone tetracarboxylic dianhydride; ethyleneglycol bistrimellitate dianhydride and a dianhydride having the following formula:

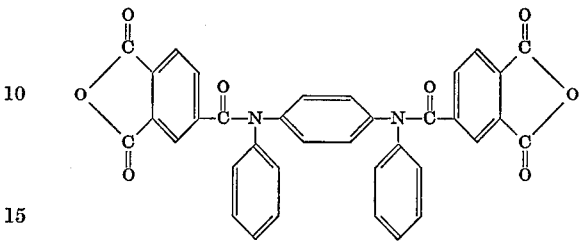

Preferred dianhydrides include pyromellitic dianhydride and benzo phenone tetracarboxylic dianhydride. Examples of diamines include allylenediamines having from 2 through 8 carbon atoms such as hexamethylenediamine; m-phenylenediamine and diamines having the formula:

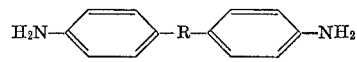

where R is one of the divalent radicals selected from the group consisting of $C_1$ through $C_3$, alkylene;

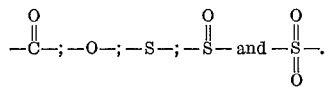

Preferred diamines include bis(4-aminophenyl) ether, bis(4-aminophenyl) sulfide, meta-phenylenediamine and para-phenylenediamine.

The base polymeric composition is prepared as previously described so that at least 5% of the polymers are terminated by at least one isocyanate or isothiocyanate group. Depending upon the particular end use requirements of the block copolymer, the weight of the imide constituent may vary generally from about 25% to about 75% of the total weight of the block copolymer. It is desirable, as obvious to one skilled in the art, that the equivalent ratio of the diamines to the dianhydrides preferably should in the vicinity of one in order to avoid free or unreacted monomers and that an amount of imide forming monomers should be used to achieve a desirable molecular weight of the imide constituent which is generally between 10,000 and 35,000. Of course, higher or lower molecular weights may often be desirable.

In order that the isocyanate terminated base polymers do not react with compounds containing active hydrogens such as water, alcohol or acids, with the exception of the monomer, but remain free to be blocked to an imide constituent, it is generally important that the process of formation and polymerization of the isocyanate terminated base polymers be carried out in an environment substantially free from active hydrogens such as in an inert nitrogen atmosphere. It should be understood however, that a small amount of active hydrogen may be present provided that a sufficient number of isocyanate terminated base polymers may be reacted to produce a block copolymer having desirable properties.

In the preparation of the imide block copolymer, a diamine monomer is added to the base polymer whereupon the diamine reacts with the isocyanate terminated polymers. A dianhydride monomer is then generally added in an amount which preferably is slightly less than the amount of the diamine. Polymerization readily occurs upon the application of heat with the temperature range of the polymerization generally being simply room temperature and ranging up to about 100° C. Hence, catalysts are usually not required. The reaction vessel contains an imide solvent such as dimethyl formamide, dimethyl acetamide and dimethyl sulfoxide and the base polymer solvent is removed by distillation. Since the formation of the imide constituent is extremely moisture sensitive, it is very important that substantially all traces of moisture be absent in the reaction vessel so that polymerization is not retarded.

The formation of the imide constituent is a condensation reaction and water is the byproduct of the reaction. Since the water will not distill free from the imide constitutent, an aromatic solvent such as toluene or benzene is added to the reaction to produce an azeotrope. The water is then removed by heating the vessel and condensing the water and aromatic solvent vapors. If a Dean-Stark trap is used to condense the vapors, the amount of aromatic solvent required is diminished since the water in having a higher specific gravity than the aromatic solvent will accumulate in the bottom of the trap with the solvent overflowing the upper portion trap and flowing back into the reaction vessel. The reflux temperature of the vessel is determined by the type of aromatic solvent. The imide block copolymer upon the completion of the polymerization exists in a nonaqueous suspension and can be separated from the solvent as by drum drying or the polymers can be precipitated by any nonsolvent, that is, a solution whch is not a solvent for the base constituent of the block copolymer.

The imide block copolymers containing the various weight percents of imide constituent as indicated above and containing base polymers constituents generally made from any of the previously noted base forming monomers may generally be cured in any conventional manner. An exception are those copolymers which have a base polymer that tends to degrade upon curing such as the base polymer made from the various vinyl aromatic monomers. Improved physical properties may be obtained, and especially when the base polymer constituent has a high vinyl content, where a particular class of organic peroxides having the formula

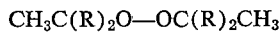
$$CH_3C(R)_2O—OC(R)_2CH_3$$

is used wherein R represents aryl or alkyl including cycloalkyl, aralkyl, alkaryl, etc., of 1–20 carbon atoms, inclusive. Examples of typical R groups as well as specific mixed peroxides or diperoxides are those previously listed under the discussion of the nylon block copolymers. An example of a preferred peroxide is dicumyl peroxide.

In general, the various imide block copolymers possess properties generally exhibited by conventional imide polymers. The various imide block copolymers are usually very strong, very light and due to their preparation are void free. Furthermore, the molecular weight reduction due to cleavage and degradation upon heating to 600° C. is usually much lower for the imide block copolymers of the present invention when compared to the weight reduction of conventional imide polymers. Another advantage of the imide block copoymers is that they can be processed as by cold milling and molding at low temperatures such as about 150° C. as compared to temperatures of 600° C. required by conventional imide polymers. Thus, the imide block copolymers of the present invention can be used as solids or coatings as well as films. A few specific uses for the imide block copolymers include valve seats, seals, retaining rings, compressor vanes, piston and bearing retaining rings, electrical relay activators, wire and cable wrap, motor slot liners, formed coil wrap, transformers, tapes, hose and tubing as well as molded items.

In addition to the various different types of monomers used to make the base polymer, the base polymer, as previously noted, may be a coplymer such as styrene-butadiene. An imide block copolymer having such a base polymer, when cured, will also exhibit the general properties and uses of the previously mentioned imide block copolymers.

The invention will be more fully understood by referring to the following examples which describe the preparation and properties of the various imide block copolymers.

Example I.—Preparation of a Block Copolymer of Vinyl Polybutadiene With the Polyimide From Benzophenone Tetracarboxylic Dianhydride and Metaphenylene Diamine 40/60

To a clean dry 28 oz. beverage bottle was added 600 cc. of purified cyclohexane, 51.4 g. of purified butadiene and 0.44 cc. of tetramethyl ethylene diamine. The solution was then cooled to 0° C. in an ice bath before adding 1.71 cc. of a 1.51 molar butyl lithium solution. After 2.5 hours, the bottle was sampled and it was determined that the base polymer had a molecular weight of 21,700 and an intrinsic viscosity of 0.331. The vinyl content of this sample was shown by N.M.R. to be 90%. To this bottle of lithium polybutadiene was rapidly added 2.38 cc. of a 1.081 M toluene diisocaynate solution in toluene which indicated upon sampling a molecular weight of 33,200. To this solution was added 20 cc. of molten purified metaphenylene diamine and 15 cc. of a 10% phenyl-beta-naphthylamine solution in toluene. This mixture was then transferred to a clean, dry, nitrogen purged resin kettle containing 600 cc. of purified dimethyl acetamide (DMAC). The cyclohexane was removed by distillation and the temperature was then stabilized at 67° C. when the viscosity of the solution was measured. The solution was stirred and 64.4 g. of pure benzophenone tetracarboxylic dianhydride was added which gave a rapid relative viscosity increase to 4.78. Slow addition of more anhydride caused the viscosity to reach a maximum of 10.4 after an addition of 2.2 g. and the addition was finally stopped at a relative viscosity of 10.1 after the addition of another 0.7 g. of dianhydride. A Dean-Stark trap was placed on the resin kettle and 100 cc. of purified toluene was added and the solution was then heated to 130° C. A steady evolution of water was observed along with some carry over of DMAC. When the toluene insoluble phase reached 30–50% of completion, the clean solution became a yellow-brown opaque suspension. The reaction was continued for 16 hours during which time the water evolution stopped. The toluene insoluble layer was shown by G.P.C. to contain the expected amount of water along with DMAC and a small amount of toluene. Upon completion of the reaction the suspension was precipitated in methanol, washed and dried in a vacuum. The copolymer would readily disperse in solvents for the base polymer (polybutadiene) to give a latex but was not soluble in any solvent. This copolymer was millable at room temperature which allowed the addition of 12 parts of dicumyl peroxide per 100 parts of rubber present in the copolymer. Curing of this milled sampled at 145° C. for 3 hours (10 half-lives of the peroxides) gave a flexural modulus of 430,000 p.s.i., a flexural strength of 7,490 p.s.i., 0.21 ft. lbs./inch notch Izod impact strength, 1.8 inch lbs. Gardner impact strength, a 91.5 Rockwell E hardness and a 178° C. 264 p.s.i. heat distortion temperature. Thermal gravimetric analysis (T.G.A.) run at 10° C./minute in air and nitrogen showed almost identical curves with an onset temperature of 438° C. and with a total weight loss of 45% in air up to 579° C. and with a total weight loss of 50% in nitrogen up to 579° C. Isothermal T.G.A. at 450° C. in air and nitrogen showed a rapid weight loss during the first 3 minutes and then showed the following results.

| Time (minutes) | Percent weight loss in— | |
|---|---|---|
|  | Air | Nitrogen |
| 5 | 52 | 32 |
| 30 | 55 | 36 |
| 100 | 67 | 38 |

EXAMPLE II-V

[In a similar manner the following copolymers were prepare and cured]

| Sample | Percent polyamide constituent | Dicup, phr. | Flexural strength, p.s.i. ×10⁻³ | Modulus, p.s.i. ×10⁻⁵ | Gardner impact, in.-lbs. | Rockwell E hardness | Heat dist. temp., °C. at 264 p.s.i. |
|---|---|---|---|---|---|---|---|
| 2 | 70 | 4 | 7.62 | 4.08 | 1.75 | 63 | |
| | | 8 | 6.70 | 4.57 | 1.31 | 81 | |
| 3 | 70 | 8 | 6.91 | 4.00 | 1.88 | 65 | 164 |
| 4 | 70 | 8 | 5.86 | 4.92 | 0.75 | 91 | |
| 5 | 70 | 8 | 4.80 | 4.92 | 0.75 | 83.5 | 152 |
| | | 12 | 4.31 | 4.90 | 1.06 | 90 | 167 |

T.G.A.

| Sample number | Dicup, phr. | T onset, °C. Nitrogen | Air | Percent wt. loss at 579° C. Nitrogen | A |
|---|---|---|---|---|---|
| 2 | 8 | 433 | 433 | 29 | 23 |
| 3 | 8 | 425 | 438 | 47 | 42 |
| 4 | 8 | 391 | 391 | 42 | 75 |
| 5 | 8 | 433 | 438 | 43 | 46 |
| | 12 | 414 | 438 | 41 | 40 |

It can be seen that the disclosed invention carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A polymeric composition comprising an end capped polymer connected to an active hydrogen containing monomer or an active hydrogen containing polymer other than said monomer or said polymer used in forming said end capped polymer, said end capped polymer containing a base polymer connected to a single compound selected from the group consisting of a polyisocyanate and a polyisothiocyanate through one of the isocyanate groups or isothiocyanate groups, said base polymer made by the anionic polymerization of monomers selected from the group consisting of olefin, conjugated diene, vinyl substituted aromatic, vinyl substituted pyridine, vinyl substituted guinoline,

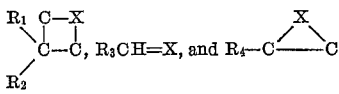

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, and said active hydrogen containing monomer or said active hydrogen containing polymer connected to said end capped polymer through another isocyanate group of said polyisocyanate or another isothiocyanate group of said polyisothiocyanate.

2. A polymeric composition as in claim 1, wherein said active hydrogen containing monomer or polymer compound is selected from the group consisting of compounds having a hydrogen-nitrogen bond, a hydrogen-oxygen bond and a hydrogen-sulfur bond.

3. A polymeric composition as in claim 1, wherein said base polymer is formed in the presence of an organo alkali metal initiator having the formula RLi where R is selected from the group consisting of an aliphatic having from 1 to 30 carbon atoms, a cycloaliphatic having from 4 to 30 carbon atoms and an aromatic having from 6 to 30 carbon atoms.

4. A polymeric composition as in claim 1, wherein said base constituent monomers are conjugated dienes selected from the group consisting of butadiene and isoprene.

5. A polymeric composition as in claim 1, wherein said base constituent monomers are vinyl substituted aromatics selected from the group consisting of styrene, α-methylstyrene and 4-t-butylstyrene.

6. A polymeric composition as in claim 1, wherein said base polymer is a styrene-butadiene copolymer.

7. A polymeric composition as in claim 1, wherein said polyisocyanate compound is selected from the group consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

8. A polymric composition as in claim 1, wherein said polyisothiocyanate compound is selected from the group consisting of para-phenylene diisothiocyanate, meta-phenylene diisothiocyanate, diphenyl methane diisothiocyanate, dianisidine diisothiocyanates, isophorone diisothiocyanates, toluene diisothiocyanates, bitolylene diisothiocyanates, hexamethylene diisothiocyanate and pentamethylene diisothiocyanate.

9. A block copolymer composition comprising a nylon polymer constituent blocked to at least one end capped polymer constituent to form the block copolymer, said end capped polymer constituent containing a base polymer constituent connected to a single compound selected from the group consisting of a polyisocyanate and a polyisothiocyanate through one of the isocyanate groups or the isothiocyanate groups, said base polymer made by the anionic polymerization of monomers selected from the group consisting of olefin, conjugated diene, vinyl substituted aromatic, vinyl substituted pyridine, vinyl substituted quinoline,

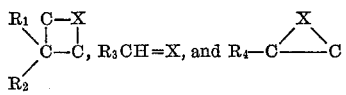

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, said nylon polymer constituent connected to said end capped polymer through another isocyanate group of said polyisocyanate or another isothiocyanate group of said polyisothiocyanate and produced by the anionic polymerizations of lactams.

10. A block copolymer composition as in claim 9, wherein said base polymer is formed in the presence of an organo alkali metal initiator having the formula RLi where R is selected from the group consisting of an aliphatic having from 1 to 30 carbon atoms, a cycloaliphatic having from 4 to 30 carbon atoms and an aromatic having from 6 to 30 carbon atoms.

11. A block copolymer composition as in claim 9, wherein said base constituent monomers are conjugated dienes selected from the group consisting of butadiene and isoprene.

12. A block copolymer composition as in claim 9, wherein said base constituent monomers are vinyl substituted aromatics selected from the group consisting of styrene, α-methylstyrene and 4-t-butylstyrene.

13. A block copolymer composition as in claim 9, wherein said base polymer is a styrene-butadiene copolymer.

14. A block copolymer composition as in claim 9, wherein said polyisocyanate compound is selected from the group consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

15. A block copolymer composition as in claim 9, wherein said polyisothiocyanate, compound is selected from the group consisting of para-phenylene diisothiocyanate, metaphenylene diisothiocyanate, diphenyl methane diisothiocyanates, dianisidine diisothiocyanates, isophorone diisothiocyanates, toluene diisothiocyanates, bitolylene diisothiocyanates, hexamethylene diisothiocyanate and pentamethylene diisothiocyanate.

16. A block copolymer composition as in claim 9, wherein said block copolymer composition is reinforced with fillers selected from the group consisting of silica and calcium carbonate.

17. A block copolymer composition as in claim 9, wherein said block copolymer composition is cured by organic peroxides having the formula, $$CH_3C(R)_2O—OC(R)_2CH_3$$

wherein R is a group selected from aryl or alkyl including cycloalkyl, aralkyl and alkaryl having 1–20 carbon atoms, inclusive.

18. A block copolymer composition as in claim 17, wherein said organic peroxide is dicumyl peroxide.

19. A block copolymer composition comprising a urea polymer constituent blocked to at least one end capped polymer constituent to form the block copolymer, said end capped constitutent containing a base polymer connected to a single compound selected from the group consisting of a polyisocyanate and a polyisothiocyanate through one of the isocyanate groups or the isothiocyanate groups, said base polymer made by the anionic polymerization of monomers selected from the group consisting of olefin, conjugated diene, vinyl substituted aromatic, vinyl substituted pyridine, vinyl substituted quinoline,

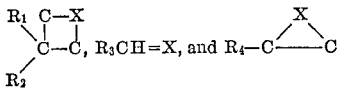

where $R_1$, $R_2$, $R_3$, and $R_4$ are setlected from the group consisting of an aliphatic containing from 1 to 15 carbon atoms, a cycloaliphatic containing from 4 to 15 carbon atoms, and an aromatic containing from 6 to 15 carbon atoms; where $R_4$ is also an H; and where X is O or S, said urea polymer constituent connected to said end capped polymer through another isocyanate group of said polyisocyanate or another isothiocyanate group of said polyisothiocyanate and produced by the polymerization of a compound selected from the group consisting of water and a diamine with a polyisocyanate.

20. A block copolymer composition as in claim 19, wherein said base polymer is formed in the presence of an organo alkali metal initiator having the formula RLi where R is selected from the group consisting of an aliphatic having from 1 to 30 carbon atoms, a cycloaliphatic having from 4 to 30 carbon atoms and an aromatic having from 6 to 30 carbon atoms.

21. A block copolymer composition as in claim 19, wherein said base constituent monomers are conjugated dienes selected from the group consisting of butadiene and isoprene.

22. A block copolymer composition as in claim 19, wherein said base constituent monomers are vinyl substituted aromatic selected from the group consisting of styrene, α-methylstyrene and 4-t-butylstyrene.

23. A block copolymer composition as in claim 19, wherein said base polymer is a styrene-butadiene copolymer.

24. A block copolymer composition as in claim 19, wherein said polyisocyanate compound which is reacted with said base polymer is selected from the group consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

25. A block copolymer composition as in claim 19, wherein said polyisothiocyanate compound which is reacted with said base polymer is selected from the group consisting of para-phenylene diisothiocyanate, metaphenylene diisothiocyanate, diphenyl methane diisothiocyanates, dianisidine diisothiocyanates, isophorone diisothiocyanates, toluene diisothiocyanates, bitolylene diisothiocyanates, hexamethylene diisothiocyanate and pentamethylene diisothiocyanate.

26. A block copolymer composition as in claim 19, wherein said polyisocyanate which is reacted with said diamine is selected from the group consisting of meta-paraphenylene diisocyanate, diphenyl methane diisocyanates, dianisidine diisocyanates, isophorone diisocyanates, toluene diisocyanates, bitolylene diisocyanates, hexamethylene diisocyanate, and pentamethylene diisocyanate.

27. A block copolymer composition as in claim 19, wherein said diamine has the formula $NH_2—R—NH_2$ where R is an aliphatic group containing from 2 to about 20 carbon atoms, a cycloaliphatic group containing from 4 to about 20 carbon atoms and an aromatic group containing from 6 to about 20 carbon atoms.

28. A block copolymer composition as in claim 19, wherein said block copolymer composition is reinforced with carbon black.

29. A block copolymer composition comprising a urethane polymer constituent blocked to at least one end capped polymer constituent to form the block copolymer, said end capped constituent containing a base polymer connected to a single compound selected from the group consisting of a polyisocyanate and a polyisothiocyanate through one of the isocyanate groups or the isothiocyanate groups, said base polymer made by the anionic polymerization of monomers selected from the group consisting of olefin, conjugated diene, vinyl substituted aromatic, vinyl substituted pyridine, vinyl substituted quinoline,

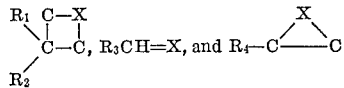

where $R_1$, $R_2$, $R_3$ and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, said urethane polymer constituent connected to said end capped polymer through another isocyanate group of said polyisocyanate or another isothiocyanate group of said polyisothiocyanate and produced by the polymerization of a polyhydroxy compound which has at least two hydroxy groups with a polyisocyanate.

30. A block copolymer composition as in claim 29, wherein said base polymer is formed in the presence of an organo alkali metal initiator having the formula RLi where R is selected from the group consisting of an aliphatic having from 1 to 30 carbon atoms, a cycloaliphatic having from 4 to 30 carbon atoms and an aromatic having from 6 to 30 carbon atoms.

31. A block copolymer composition as in claim 29, wherein said base constituent monomers are conjugated dienes selected from the group consisting of butadiene and isoprene.

32. A block copolymer composition as in claim 29, wherein said base constituent monomers are vinyl substituted aromatic selected from the group consisting of styrene, α-methylstyrene and 4-t-butylstyrene.

33. A block copolymer composition as in claim 29, wherein said base polymer is a styrene-butadiene copolymer.

34. A block copolymer composition as in claim 29, wherein said polyisocyanate compound which is reacted with said base polymer is selected from the group consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

35. A block copolymer composition as in claim 29, wherein said polyisothiocyanate compound which is reacted with said base polymer is selected from the group consisting of para-phenylene diisothiocyanate, meta-phenylene diisothiocyanate, diphenyl methane diisothiocyanates, dianisidine diisothiocyanates, isophorone diisothiocyanates, toluene diisothiocyanates, bitolylene diisothiocyanates, hexamethylene diisothiocyanates and pentamethylene diisothiocyanate.

36. A block copolymer composition as in claim 29, wherein said polyisocyanate which is reacted with said polyhydroxy is selected from the group consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

37. A block copolymer composition as in claim 29, wherein said polyhydroxy compound is selected from the group consisting of dihydric alcohols, polyhydric alcohols, dihydric phenols, polyhydric phenols, polyethers, polyesters, polylactone diols and castor oil.

38. A block copolymer composition as in claim 29, wherein said block copolymer composition is reinforced with carbon black.

39. A block copolymer composition comprising a urethane-urea copolymer constituent connected to at least one end capped polymer constituent to form the block copolymer, said end capped polymer constituent produced by the reaction of a base polymer and a compound selected from the group consisting of a polyisocyanate and a polyisothiocyanate, said base polymer made by the polymerization of monomers in the presence of an organo alkali metal initiator to yield an alkali metal terminated base polymer where said monomers are selected from the group consisting of olefin, conjugated diene, vinyl substituted aromatic, vinyl substituted pyridine, vinyl substituted quinoline, $$R_1-\overset{S}{\underset{}{C}}-R_2, \quad \overset{R_3}{\underset{R_4}{\diagdown}}\overset{C-X}{\underset{C-C}{\mid}}, \quad R_5CH=X, \text{ and } R_6-C\overset{X}{\diagup\diagdown}C$$

where $R_1$, $R_2$, $R_3$, $R_4$, $R_5$ and $R_6$ are an aliphatic containing from 1 to 15 carbon atoms, a cycloaliphatic containing from 4 to 15 carbon atoms and an aromatic containing from 6 to 15 carbon atoms; where $R_6$ is also an H; and where X is O or S, said compound selected from the group consisting of polyisocyanate and a polyisothiocyanate present in a sufficient amount to cause at least 5 percent of said alkali metal terminated base polymers to be terminated by at least one compound selected from the group consisting of an isocyanate and an isothiocyanate, said block urethane-urea copolymer constituent produced by the polymerization of a diamine and a polyhydroxy compound which has at least two hydroxyl groups with a polyisocyanate.

40. A block copolymer composition comprising a urethane-urea copolymer constituent blocked to at least one end capped polymer constituent to form the block copolymer, said end capped constituent containing a base polymer connected to a single compound selected from the group consisting of a polyisocyanate and a polyisothiocyanate groups, said base polymer made by the anionic polymerization of monomers selected from the group consisting of olefin, conjugated diene, vinyl substituted aromatic, vinyl substituted pyridine, vinyl substituted quinoline, $$\overset{R_1}{\underset{R_2}{\diagdown}}\overset{C-X}{\underset{C-C}{\mid}}, \quad R_3CH=X, \text{ and } R_4-C\overset{X}{\diagup\diagdown}C$$

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, said urethane-urea copolymer constituent connected to said end capped polymer through another isocyanate group of said polyisocyanate or another isothiocyanate group of said polyisothiocyanate and produced by the polymerization of a diamine and a polyhydroxy compound which has at least two hydroxyl groups with a polyisocyanate.

41. A block copolymer composition as in claim 40, wherein said base polymer is formed in the presence of an organo alkali metal initiator having the formula RLi where R is selected from the group consisting of an aliphatic having from 1 to 30 carbon atoms, a cycloaliphatic having from 4 to 30 carbon atoms and an aromatic having from 6 to 30 carbon atoms.

42. A block copolymer composition as in claim 40, wherein said base constituent monomers are conjugated dienes selected from the group consisting of butadiene and isoprene.

43. A block copolymer composition as in claim 40, wherein said base constituent monomers are vinyl substituted aromatic selected from the group consisting of styrene, α-methylstyrene and 4-t-butylstyrene.

44. A block copolymer composition as in claim 40, wherein said base polymer is a styrene-butadiene copolymer.

45. A block copolymer composition as in claim 40, wherein said polyisocyanate compound which is reacted with said base polymer is selected from the group consisting of para-phenylene diisocyanate, meta-phenylene diisocyanate, diphenyl methane diisocyanates, dianisidine diisocyanates, isophorone diisocyanates, toluene diisocyanates, diphenyl methane diisocyanates, dianisidine diisocyanates, isophorone diisocyanates, toluene diisocyanates, bitolylene diisocyanates, hexamethylene diisocyanate and pentamethylene diisocyanate.

46. A block copolymer composition as in claim 40, wherein said polyisothiocyanate compound which is reacted with said base polymer is selected from the group consisting of paraphenylene diisothiocyanate, meta-phenylene diisothiocyanate, diphenyl methane diisothiocyanates, dianisidine diisothiocyanates, isophorone diisothiocyanates, toluene diisothiocyanates, bitolylene diisothiocyanates, hexamethylene diisothiocyanates and pentamethylene diisothiocyanate.

47. A block copolymer composition as in claim 40, wherein said polyisocyanate which is reacted with said polyhydroxy is selected from the group consisting of paraphenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

48. A block copolymer composition as in claim 40, wherein said polyhydroxy compound is selected from the group consisting of dihydric alcohols, polyhydric alcohols, dihydric phenols, polyhydric phenols, polyethers, polyesters, polylactone diols and castor oil.

49. A block copolymer composition as in claim 40, wherein said diamine has the formula NH₂—R—NH₂ where R is an aliphatic group containing from 2 to about 20 carbon atoms, a cycloaliphatic group containing from 4 to about 20 carbon atoms and an aromatic group containing from 6 to about 20 carbon atoms.

50. A block copolymer composition as in claim 40, wherein said block copolymer is reinforced with carbon black.

51. A block copolymer composition comprising an imide polymer constituent blocked to at least one end capped polymer constituent to form the block copolymer, said end capped constituent containing a base polymer connected to a single compound selected from the group consisting of a polyisocyanate and a polyisothiocyanate through one of the isocyanate groups or the isothiocyanate groups, said base polymer made by the anionic polymerization of monomers selected from the group consisting of olefin, conjugated diene, vinyl substituted aromatic, vinyl substituted pyridine, vinyl substituted quinoline,

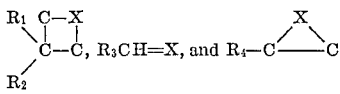

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, said imide polymer constituent connected to said end capped polymer through another isocyanate group of said polyisocyanate or another isothiocyanate group of said polyisothiocyanate and produced by the polymerization of an aromatic dianhydride and a compound selected from the group consisting of an aromatic diamine and an alkyl diamine.

52. A block copolymer composition as in claim 51, wherein said base polymer is formed in the presence of an organo alkali metal initiator having the formula RLi where R is selected from the group consisting of an aliphatic having from 1 to 30 carbon atoms, a cycloaliphatic having from 4 to 30 carbon atoms and an aromatic having from 6 to 30 carbon atoms.

53. A block copolymer composition as in claim 51, wherein said base constituent monomers are conjugated dienes selected from the group consisting of butadiene and isoprene.

54. A block copolymer composition as in claim 51, wherein said base constituent monomers are vinyl substituted aromatics selected from the group consisting of styrene, α-methylstyrene, and 4-t-butylstyrene.

55. A block copolymer composition as in claim 51, wherein said base polymer is a styrene-butadiene copolymer.

56. A block copolymer composition as in claim 51, wherein said polyisocyanate compound which is reacted with said base polymer is selected from the group consisting of paraphylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

57. A block copolymer composition as in claim 51, wherein said polyisothiocyanate compound which is reacted with said base polymer is selected from the group consisting of para-phenylene diisothiocyanate, meta-phenylene diisothiocyanate, diphenyl methane diisothiocyanates, dianisidine diisothiocyanates, isophorone diisothiocyanates, toluene diisothiocyanates, bitolylene diisothiocyanates, hexamethylene diisothiocyanate and pentamethylene diisothiocyanate.

58. A block copolymer composition as in claim 51, wherein said aromatic dianhydride is selected from the group consisting of a pyromellitic dianhydride and benzophenone tetarcarboxylic dianhydride.

59. A block copolymer composition as in claim 51, wherein said aromatic diamines are selected from the group consisting of bis(4-aminophenyl) ether, bis(4-aminophenyl) sulfide, meta phenylenediamine and para phenylenediamine.

60. A block copolymer composition as in claim 51, wherein said block copolymer composition is cured by organic peroxides having the formula,

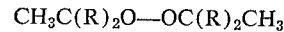

wherein R is a group selected from aryl or alkyl including cycloalkyl, aralkyl and alkaryl having 1–20 carbon atoms, inclusive.

61. A block copolymer composition as in claim 51, wherein said organic peroxide is dicumyl peroxide.

62. A block copolymer composition comprising a thiourea polymer constituent blocked to at least one end capped polymer constituent to form the block copolymer, said end capped constituent containing a base polymer connected to a single compound selected from the group consisting of a polyisocyanate and a polyisothiocyanate through one of the isocyanate groups or the isothiocyanate groups, said base polymer made by the anionic polymerization of monomers selected from the group consisting of olefin, conjugated diene, vinyl substituted aromatic, vinyl substituted pyridine, vinyl substituted quinoline,

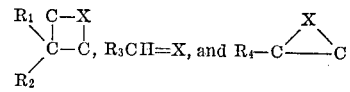

where $R_1$, $R_2$, $R_3$, and $R_4$ are selected from the group consisting of an aliphatic containing from 1 to 15 carbon atoms, a cycloaliphatic containing from 4 to 15 carbon atoms, and an aromatic containing from 6 to 15 carbon atoms; where $R_4$ is also an H; and where X is O or S, said thiourea polymer constituent connected to said end capped polymer through another isocyanate group of said polyisocyanate or another isothiocyanate group of said polyisothiocyanate and produced by the polymerization of a compound selected from the group consisting of water and a diamine with a polyisothiocyanate.

63. A block copolymer composition comprising a thiourethane polymer constituent blocked to at least one end capped polymer constituent to form the block copolymer, said end capped constituent containing a base polymer connected to a single compound selected from the group consisting of a polyisocyanate and a polyisothiocyanate through one of the isocyanate groups or the isothiocyanate groups, said base polymer made by the anionic polymerization of monomers selected from the group consisting of olefin, conjugated diene, vinyl substituted aromatic, vinyl substituted pyridine, vinyl substituted quinoline,

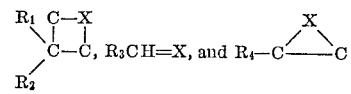

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, said thiourethane polymer constituent connected to said end capped polymer through another isocyanate group of said polyisocyanate or another isothiocyanate group of said polyisothiocyanate and produced by the polymerization of a polyhydroxy compound which has at least two hydroxyl groups with a polyisothiourethane.

64. A method for making a block copolymeric composition having a nylon polymer constituent blocked to at least one end capped base polymer constituent comprising the steps of anionically polymerizing monomers selected from the group consisting of olefin, conjugated diene, vinyl substituted aromatic, vinyl substituted pyridine, vinyl substituted quinoline,

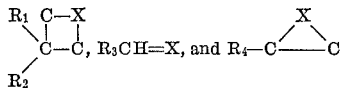

where $R_1$, $R_2$, $R_3$, and $R_4$ are selected from the group consisting of an aliphatic containing from 1 to 15 carbon atoms, a cycloaliphatic containing from 4 to 15 carbon atoms and an aromatic containing from 6 to 15 carbon atoms; where $R_4$ is also an H; and where X is O or S, in the presence of an organo alkali metal initiator to form alkali metal terminated based polymers rapidly adding a sufficient amount of a compound selected from the group consisting of a polyisocyanate and a polyisothiocyanate to said base polymer so that at least 5 percent of said base polymers are end capped by a single polyisocyanate or a polyisothiocyanate through one of the isocyanate groups of the isothiocyanate groups, maintaining said end capped base polymer constituent in an environment substantially free from compounds containing active hydrogens and reacting said end capped base polymer through another isocyanate group or isothiocyanate group with lactams having from 3 to 16 total carbon atoms to form a nylon polymer constituent and thereby forming the block copolymer.

65. A method for making a block copolymeric composition as set forth in claim 64 wherein said environment contains less than 100 parts per million of active hydrogen compounds.

66. A block copolymer composition comprising a nylon polymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $$R(N=C=X)_n$$

where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene, α-methylstyrene, 4-t-butylstyrene and mixtures thereof, said polyoscyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said nylon polymer through another isocyanate or isothiocyanate group and said nylon polymer produced by the anionic polymerization of lactams having from 3 to about 16 carbon atoms.

67. A block copolymer composition as in claim 66 wherein said lactam is seletcted from the group consisting of caprolactam and caprylactam.

68. A block copolymer composition comprising a urea polymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $$R(N=C=X)_n$$

where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene, α-methylstyrene, 4-t-butylstyrene and mixtures thereof, said polyisocyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said urea polymer through another isocyanate or isothiocyanate group and said urea polymer produced by the polymerization of a compound seletcted from the group consisting of water and a diamine with a polyisocyanate.

69. A block copolymer composition as in claim 68 where said diamine has the formula $NH_2$—R—$NH_2$ where R is an aliphatic group containing from 2 to about 20 carbon atoms, a cycloaliphatic group containing from 4 to about 20 carbon atoms, or an aromatic group containing from 6 to about 20 carbon atoms.

70. A block copolymer composition as in claim 68 where said polyisocyanate for producing said urea polymer has the formula $R(N=C=O)_n$ where R is an aliphatic group having from 2 to about 20 carbon atoms, a cycloaliphatic group having from 4 to about 20 carbon atoms and an aromatic group having from 6 to about 20 carbon atoms and where $n$ is an interger of 2 or 3.

71. A block copolymer composition comprising a urethane polymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $R(N=C=X)_n$ where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene α-methylstyrene, 4-t-butylstyrene and mixtures thereof, said polyisocyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said urethane polymer through another isocyanate or isothiocyanate group and said urethane polymer produced by the polymerization of a polyhydroxy compound which has at least two hydroxyl groups with a polyisocyanate.

72. A block copolymer composition as in claim 71 wherein said polyhydroxy compound is selected from the group consisting of dihydric alcohols, polyhydric alcohols, dihydric phenols, polyhydric phenols, polyethers, polyesters, polyacetone diols and castor oil.

73. A block copolymer composition as in claim 71 where said polyisocyanates for producing said urethane polymer has the formula $R(N=C=O)_n$ where R is an aliphatic group having from 2 to about 20 carbon atoms, a cycloaliphatic group having from 4 to about 20 carbon atoms and an aromatic group having from 6 to about 20 carbon atoms where $n$ is an integer of 2 or 3.

74. A block copolymer composition comprising a urethane-urea copolymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $R(N=C=X)_n$ where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene, α-methylstyrene, 4-t-butylstyrene and mixtures thereof, said polyisocyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said urethane-urea copolymer through another isocyanate or isothiocyanate group and said urethane-urea copolymer produced by the polymerization of a diamine and a polyhydroxy compound which has at least two hydroxyl groups with a polyisocyanate.

75. A block copolymer composition as in claim 74 wherein said polyhydroxy compound is selected from the group consisting of dihydric alcohols, polyhydric alcohols, dihydric phenols, polyhydric phenols, polyethers, polyesters, polylactone diols and castor oil.

76. A block copolymer composition as in claim 74 where said polyisocyanate for producing said urethane polymer has the formula $R(N=C=O)_n$ where R is an aliphatic group having from 2 to about 20 carbon atoms, a cycloaliphatic group having from 4 to about 20 carbon atoms and an aromatic group having from 6 to about 20 carbon atoms where $n$ is an integer of 2 or 3.

77. A block copolymer composition as in claim 74 where said diamine has the formula $NH_2$—R—$NH_2$ where R is an aliphatic group containing from 2 to about 20 carbon atoms, a cycloaliphatic group containing from 4 to about 20 carbon atoms, or an aromatic group containing from 6 to about 20 carbon atoms.

78. A block copolymer composition comprising an imide polymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $$R(N=C=X)_n$$

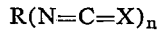

where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene, α-methylstyrene, 4-t-butylstyrene and mixtures thereof, said polyisocyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said imide polymer through another isocyanate or isothiocyanate group and said imide polymer produced by the polymerization of an aromatic dianhydride and a compound selected from the group consisting of an aromatic diamine and an alkyl diamine.

79. A block copolymer composition as in claim 78, wherein said aromatic dianhydride is selected from the group consisting of a pyromellitic dianhydride and benzophenone tetracarboxylic dianhydride.

80. A block copolymer composition as in claim 78, wherein said aromatic diamines are selected from the group consisting of bis(4-aminophenyl) ether, bis(4-aminophenyl) sulfide, meta phenylenediamine and para phenylenediamine.

81. A block copolymer composition comprising a thiourea polymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $$R(N=C=X)_n$$

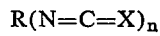

where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene, α-methylstyrene, 4-t-butylstyrene and mixtures thereof, said polyisocyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said thiourea polymer through another isocyanate or isothiocyanate group and said thiourea polymer produced by the polymerization of a compound selected from the group consisting of water and a diamine with a polyisothiocyanate.

82. A block copolymer composition as in claim 81 where said diamine has the formula $NH_2$—R—$NH_2$ where R is an aliphatic containing from 2 to about 20 carbon atoms, a cycloaliphatic containing from 4 to about 20 carbon atoms, or an aromatic containing from 6 to about 20 carbon atoms.

83. A block copolymer composition as in claim 81 where said polyisocyanate for producing said thiourea polymer has the formula $R(N=C=S)_n$ where R is an aliphatic group having from 2 to about 20 carbon atoms, a cycloaliphatic group having from 4 to about 20 carbon atoms and an aromatic group having from 6 to about 20 carbon atoms and where $n$ is an integer of 2 or 3.

84. A block copolymer composition comprising a thiourethane polymer blocked to at least one end capped polymer to form the block copolymer, said end capped polymer containing a base polymer connected to a single compound selected from the group consisting of a polyisocyanate and a polyisothiocyanate through one of the isocyanate or isothiocyanate groups and having the formula $R(N=C=X)_n$ where R is selected from the group consisting of an aliphatic having from 2 to about 20 carbon atoms, a cycloaliphatic having from 4 to about 20 carbon atoms and an aromatic having from 6 to about 20 carbon atoms where $n$ is an integer of 2 or 3 and X is either an oxygen or a sulfur atom, said base polymer made by the anionic polymerization of monomers in the presence of an organo alkali metal initiator having the formula RLi where R is selected from the group consisting of an aliphatic having from 1 to 30 carbon atoms, a cycloaliphatic having from 4 to 30 carbon atoms to yield an alkali metal terminated base polymer where said monomers are selected from the group consisting of butadiene, isoprene, styrene, α-methylstyrene, 4-t-butylstyrene and mixtures thereof, said polyisocyanate or said polyisothiocyanate present in a sufficient amount to cause at least 20 percent of said alkali metal terminated base polymers to be end capped by said polyisocyanate or polyisothiocyanate, said polyisocyanate or said polyisothiocyanate connected to said thiourethane polymer through another isocyanate or isothiocyanate group and said thiourethane polymer produced by the polymerization of a polyhydroxy compound which has at least two hydroxyl groups with a polyisothiourethane.

85. A block copolymer composition as in claim 84 wherein said polyhydroxy compound is selected from the group consisting of dihydric alcohols, polyhydric alcohols, dihydric phenols, polyhydric phenols, polyethers, polyesters, polylactone diols and castor oil.

86. A block copolymer composition as in claim 84 where said polyisothiocyanate for producing said thiourethane polymer has the formula $R(N=C=S)_n$ where R is an aliphatic group having from 2 to about 20 carbon atoms, a cycloaliphatic group having from 4 to about 20 carbon atoms and an aromatic group having from 6 to about 20 carbon atoms where $n$ is an integer of 2 or 3.

References Cited
UNITED STATES PATENTS

| | | | |
|---|---|---|---|
| 3,225,119 | 12/1965 | Baker | 260—874 |
| 3,595,941 | 7/1971 | Farrar et al. | 260—879 |

FOREIGN PATENTS

| | | | |
|---|---|---|---|
| 7,146 | 5/1963 | Japan | 260—77.5 CR |

OTHER REFERENCES

Godfrey et al.: Jour. Polymer Sci., Part A–1, vol. 7, 2387–2404 (1969).

HERBERT S. COCKERAM, Primary Examiner

U.S. Cl. X.R.

260— 2 EP, 18 TN, 37 N, 75 NH, 77.5 AN, 77.5 R, 94 7 N, 857, 858, 859

UNITED STATES PATENT OFFICE
CERTIFICATE OF CORRECTION

Patent No. 3,838,108              Dated September 24, 1974

Inventor(s) William L. Hergenrother and Richard J. Ambrose

It is certified that error appears in the above-identified patent and that said Letters Patent are hereby corrected as shown below:

In Column 14, Line 29, "diisoyanate" should be --diisocyanate--.

In Column 15, Line 35, "$10\text{-}5r$" should read --$10^{-5}$--.

In Column 15, Line 52, "$10\text{-}5r$" should read --$10^{-5}$--.

In Column 28, Line 21, "diisocaynate" should be --diisocyanate--.

In Column 30, Line 28, "polymric" should be --polymeric--.

In Column 31, Line 50, "setlected" should be --selected--.

In Column 34, Line 4, after "polyisothiocyanate" should be inserted --through one of the isocyanate groups or the isothiocyanate--.

In Column 34, Line 50, after toluene diisocyanates delete "diphenyl methane" through "toluene diisocyanates" in Line 52.

In Column 37, Line 67, "seletcted" should be --selected--.

In Column 38, Line 23, "seletcted" should be --selected--.

Signed and sealed this 7th day of January 1975.

(SEAL)
Attest:

McCOY M. GIBSON JR.
Attesting Officer

C. MARSHALL DANN
Commissioner of Patents